United States Patent [19]
Kawase et al.

[11] Patent Number: 6,086,272
[45] Date of Patent: Jul. 11, 2000

[54] PRINTING APPARATUS AND CONTROL METHOD THEREFOR

[75] Inventors: Yuji Kawase; Kouichi Ebina, both of Suwa, Japan

[73] Assignee: Seiko Epson Corporation, Tokyo, Japan

[21] Appl. No.: 08/824,422

[22] Filed: Mar. 26, 1997

[30] Foreign Application Priority Data

| Mar. 26, 1996 | [JP] | Japan | ................................... 8-069635 |
| Mar. 26, 1996 | [JP] | Japan | ................................... 8-069636 |

[51] Int. Cl.[7] ...................................................... B41J 5/30
[52] U.S. Cl. .......................... 400/61; 400/62; 400/120.05
[58] Field of Search ................................ 400/120.01, 61, 400/62, 70, 76, 120.05; 347/5, 175

[56] References Cited

U.S. PATENT DOCUMENTS

| 5,102,244 | 4/1992 | Takeda . |
| 5,278,582 | 1/1994 | Hongo . |
| 5,349,375 | 9/1994 | Bolash et al. ............................ 347/40 |
| 5,552,813 | 9/1996 | Takada et al. ........................... 347/40 |
| 5,625,394 | 4/1997 | Fukuda et al. .......................... 347/175 |
| 5,692,108 | 11/1997 | Donahue ................................ 395/108 |
| 5,779,377 | 7/1998 | Kumai et al. ........................... 400/555 |

FOREIGN PATENT DOCUMENTS

| 0 310 217 | 4/1989 | European Pat. Off. . |
| 56-63677 | 5/1981 | Japan . |
| 59-41277 | 3/1984 | Japan . |
| 61-262162 | 11/1986 | Japan . |
| 62-204662 | 9/1987 | Japan . |
| 63-221045 | 9/1988 | Japan . |
| 6-71879 | 3/1994 | Japan . |

*Primary Examiner*—John S. Hilten
*Attorney, Agent, or Firm*—Mark P. Watson

[57] ABSTRACT

A printer, in which nozzles for printing dots are positioned in a zigzag formation, has a simple circuit for sending to these nozzles printing data that has been expanded into a bit-map image. When sending data to a print head in which odd-numbered nozzles and even-numbered nozzles are alternately positioned, the bit data of string n+l and the bit data of string n that correspond to respective nozzles inside image buffer 20 are converted from parallel to serial before being sent. Odd-numbered bit data and even-numbered bit data are then selected from the bit data using divided clock signals, and are converted from serial to parallel for printing.

10 Claims, 16 Drawing Sheets

PRINTING APPARATUS AND CONTROL METHOD THEREFOR

BACKGROUND OF THE INVENTION

1. Field of the Invention

The invention relates to printing apparatuses such as dot-matrix printers and bit-image printers, and more particularly to printing apparatuses in which the dot printing mechanism utilizes nozzles and wires forming the individual dots positioned in a zigzag formation alternately on multiple strings.

2. Description of the Related Art

Impact-type dot printers and non-impact-type dot printers, such as ink-jet printers, use print heads in which the dot-printing mechanism, which use wires and nozzles to print individual dots and to achieve high resolution, are positioned in a zigzag formation. FIG. 15 illustrates an ordinary circuit from one such printer for sending the printing data that has been expanded into a bit-map image to the print head. Multiple nozzles 8, which print dots in correspondence to the individual bits of the printing data which has been formed into a bit map, are positioned in two strings on printing area 10 of the print head, as shown in FIG. 16. For example, a total of 128 dots can be printed. Of these nozzles, the odd-numbered nozzles are positioned on first line 11, and even-numbered nozzles are positioned along second line 12 which is separated from line 11 by distance l. Since print head 10 prints data by reciprocating over the paper surface either in the transverse or longitudinal direction, positioning nozzles 8 in such a zigzag formation enables high-resolution printing without reducing the space occupied by nozzles 8 and the mechanism required by nozzles 8. In print head 10 illustrated in FIG. 16, although the space between nozzles is 2d, high-resolution printing with a dot pitch of d can be achieved.

In a conventional circuit such as that illustrated in FIG. 15, bit data for all dots (e.g., 128 dots) of line 11 or 12 (i.e., n-th string), whichever is to be printed first depending on the direction of the head movement, is selected from printing data 21 that has been bit-mapped and stored inside image buffer 20. This selected bit data is converted into serial data by parallel-serial conversion circuit 25, and is sent to the print head. However, because the nozzles of print head 10 are positioned in a zigzag formation and nozzle strings 11 and 12 are separated by distance l, the bit data of the n-th string (string n) sent from image buffer 20 cannot be set in nozzle string 11 or 12 as is. Therefore, selection circuit 18 is provided to select the bit data corresponding to odd-numbered dots and the bit data corresponding to even-numbered dots, and the bit data for the nozzle of the line to be printed first (e.g., odd-numbered nozzle string 11) is converted into parallel data by serial-parallel conversion circuit 13, which is then set in nozzle string 11 by latch circuit 15. The bit data for the remaining even-numbered nozzle string 12 is temporarily stored in buffer circuit 19. When even-numbered nozzle string 12 moves to the position for printing the bit data stored in buffer circuit 19, the remaining bit data is set in even-numbered nozzle string 12 via serial-parallel conversion circuit 14 and latch circuit 16, and is then printed.

Consequently, buffer circuit 19 must be equipped with memory that can store the bit-mapped data to be printed at distance l between two nozzle strings 11 and 12 and with a circuit for controlling this memory. Furthermore, to print in both directions in which the print head travels, the connection between buffer circuit 19 and selection circuit 18 must be switched depending on whether nozzle string 11 or 12 is to print first. The connection between buffer circuit 19 and serial-parallel conversion circuit 13 or serial-parallel conversion circuit 14 must also be switched. Otherwise, it is necessary to provide multiple buffers for nozzle strings 11 and 12.

OBJECTS OF THE INVENTION

As printers have become smaller and less expensive in recent years, there is a need to make print heads smaller and lighter in weight. There is also a need for high-speed compact printers that offer high printing quality. Therefore, an object of the present invention is to provide a control method and a printing apparatus in which nozzles are positioned alternately on two or more strings in order to provide high-resolution printing but that can print bit-mapped data without using the aforementioned buffer circuits or complicated switching control. Another object of the present invention is to provide a high-speed printer that offers high printing quality but by providing a control method and a circuit configuration that eliminate the software processing previously used for inputting/outputting bit data and for rearranging the bit data sequence, and that improve processing speed and reduce CPU load. Still another object of the present invention is to provide a printing apparatus that can reduce the printed circuit board area occupied by control circuits by eliminating the large buffer circuits which are required in conventional apparatuses, thereby reducing both the size and weight of the print head.

SUMMARY OF THE INVENTION

In achieving the aforementioned objects, the present invention, when setting bit data in the nozzle of the print head, sends the multiple bit strings that correspond to each nozzle string every time bit data is set in the nozzle, instead of sending the bit string that corresponds to the first nozzle string of the bit-mapped printing data and temporarily storing in a buffer the bit data to be subsequently printed. Bit data corresponding to a nozzle is then selected from each bit string and is set, which is subsequently printed. Therefore, the present invention can eliminate switching control and buffer circuits.

That is, in a printing apparatus control method according to the present invention in which bit-mapped printing data is printed when a print head provided with multiple dot-printing means moves over paper surface and in which the dot-printing means are positioned in a zigzag formation along at least first and second lines which are perpendicular or transverse to the direction of the print head motion; a first process is performed in which the first bit string corresponding to the first line is selected from the printing data and is converted from parallel to serial and sent to the first dot-printing means positioned on the first line, the bit data corresponding to each dot of the first dot-printing means is selected from the serialized first bit string, is converted from serial to parallel, and is set in said first dot-printing means; then simultaneously with, before, or after said first process, a second process is performed in which the second bit string corresponding to the second line is selected from the printing data and is converted from parallel to serial and sent to the second dot-printing means positioned on the second line, the bit data corresponding to each dot of the second dot-printing means is selected from the serialized second bit string, is converted from serial to parallel, and is set in said second dot-printing means; and subsequently printing is performed using both said first and second dot-printing means. Since the use of such a control method eliminates the need for temporarily storing bit data, no buffer circuit is needed. Furthermore, since it is not necessary to change the control method even when the moving direction of the print head changes, the control can be drastically simplified and the area occupied by the control circuit can also be reduced.

If dot-printing means such as nozzles are positioned in two rows on the print head, the first dot-printing means can be positioned to print either the odd- or even-numbered bit data along the first line, and the second dot-printing means can be positioned to print bit data different from that printed by the first dot-printing means along the second line. By performing parallel-serial conversion according to a first clock and serial-parallel conversion according to a second clock which is obtained by dividing the first clock by half, odd- or even-numbered bit data can be selected from each bit string. Odd- and even-numbered bit data can be identified separately using the second clock signal and a third clock signal which is different from the second clock signal in phase. The third clock signal can be generated by a means such as inverting the phase of the second clock signal or shifting the conversion timing by one clock period.

Such a control method can be applied to a printing apparatus having a parallel-serial conversion means that converts the first bit string corresponding to the first line of the printing data from parallel to serial and sends it to the first dot-printing means positioned on the first line, and that, simultaneously with, before, or after this operation, converts the second bit string corresponding to the second line of the printing data from parallel to serial and sends it to the second dot-printing means positioned on the second line; a first serial-parallel conversion means that selects the bit data corresponding to each dot of the first dot-printing means from the serialized first bit string, converts it from serial to parallel, and sets it in said first dot-printing means; and a second serial-parallel conversion means that selects the bit data corresponding to each dot of the second dot-printing means from the serialized second bit string, converts it from serial to parallel, and sets it in said second dot-printing means. It is possible to send a serialized bit string by connecting the first and second serial-parallel conversion means to the parallel-serial conversion means, and it is also possible to connect the second serial-parallel conversion means to the parallel-serial conversion means via the first serial-parallel conversion means. In this case, the second and the first bit strings should be sent in that order from the parallel-serial conversion means to the first serial-parallel conversion means, the first serial-parallel conversion means should convert the second bit string according to the second clock signal which is obtained by dividing the first clock by half, and the first bit string should be converted from serial to parallel according to a third clock signal which is different from the second clock signal in phase. On the other hand, the second serial-parallel conversion means can set bit data in the second dot-printing means by converting the second bit string sent from the first serial-parallel conversion means, from serial to parallel according to the third clock signal.

By providing in the storage means blank dummy data for both sides of the printing data relative to the direction in which the print head moves, the dummy data is automatically sent for printing the edges of the paper even when there is no bit string to be set in the first or second dot-printing means. Therefore, the control need not be switched even when printing the edges of the paper, further simplifying the control circuit.

Of course, it is possible to position the dot-printing means on three or more lines. In such a case, all that is necessary is to adjust the division and the phase difference of the clock signal to be used for setting bit data in the dot-printing means positioned on each line, according to the number of lines.

The first process is performed in which the first bit string corresponding to the first line of the printing data is selected, only the bit data of said first bit string corresponding to the first dot-printing means is converted from parallel to serial as the first transfer data and is sent to the first dot-printing means positioned on the first line, and the serialized first transfer data is converted from serial to parallel and is set in said first dot-printing means; and simultaneously with, before, or after said first process, the second process is performed in which the second bit string corresponding to the second line of the printing data is selected, only the bit data of said second bit string corresponding to the second dot-printing means is converted from parallel to serial as the second transfer data and is sent to the second dot-printing means positioned on the second line, and the serialized second transfer data is converted from serial to parallel and is set in said second dot-printing means; and subsequently printing is performed using both the first and second dot-printing means. Since the use of such a control method eliminates the need for temporarily storing bit data, no buffer circuit is needed. Furthermore, since it is not necessary to change the control method even when the moving direction of the print head changes, the control can be drastically simplified and the area occupied by the control circuit can also be reduced.

By providing blank dummy data for both sides of printing data relative to the direction in which print head moves, and the first or second process selects dummy data as the first or second bit string if first or second bit string corresponding to first or second line cannot be selected from printing data, the line edge processing is simplified. Consequently particular software and circuit for the line edge processing are unnecessary and control can be simplified, and the control circuit can be made smaller.

Such a control method can be applied to a printing apparatus having a setting means in which the first bit string and the second bit string of the storage means corresponding to the first and second lines are set in the storage means that stores bit-mapped printing data; a parallel-serial conversion means that converts the first or second transfer data containing only the bit data corresponding to the dot-printing means of the first or second line of the first or second bit string that has been set in the setting means, from parallel to serial and sends the result; a first serial-parallel conversion means that converts the first transfer data from serial to parallel and sets the result in the dot-printing means of the first line; and a second serial-parallel conversion means that converts the second transfer data from serial to parallel and sets the result in the dot-printing means of the second line. As explained above, the storage means is preferably provided with blank dummy data for both sides of the printing data relative to the moving direction of the print head.

If the first dot-printing means is positioned so as to print either the odd- or even-numbered bit data along the first line and if the second dot-printing means is positioned so as to print either the odd- or even-numbered bit data that is different from that printed by the first dot-printing means, along the second line, a parallel-serial conversion means should select either odd- or even-numbered bit data only in advance from either the first or second bit string that is set in the setting means, and convert the selected bit data from parallel to serial as the first or second transfer data.

Of course, it is possible to position the dot-printing means on three or more lines. In such a case, all that is necessary is to select bit data having an interval that corresponds to the dot-printing means positioned on each line and to convert the selected bit data from parallel to serial as the transfer data.

It is also possible to provide the setting means with a first setting means in which the first bit string is to be set and a second setting means in which the second bit string is to be set; and to provide the parallel-serial conversion means with a first parallel-serial conversion means for sending the first transfer data to the first serial-parallel conversion means and a second parallel-serial conversion means for sending the second transfer data to the second serial-parallel conversion means. By doing so, the first and second transfer data can be simultaneously sent to the first and second serial-parallel conversion means. The parallel-serial conversion means may send the second and first transfer data in that order, the first serial-parallel conversion means may receive the second and first transfer data in that order, and the second serial-parallel conversion means may receive the second transfer data via the first serial-parallel conversion means. Such a configuration can reduce the size of the circuit required for bit data transfer, and thus can result in a smaller size.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The embodiments of the present invention will be discussed and explained in more detail below with references to the drawings.

Figure 1:
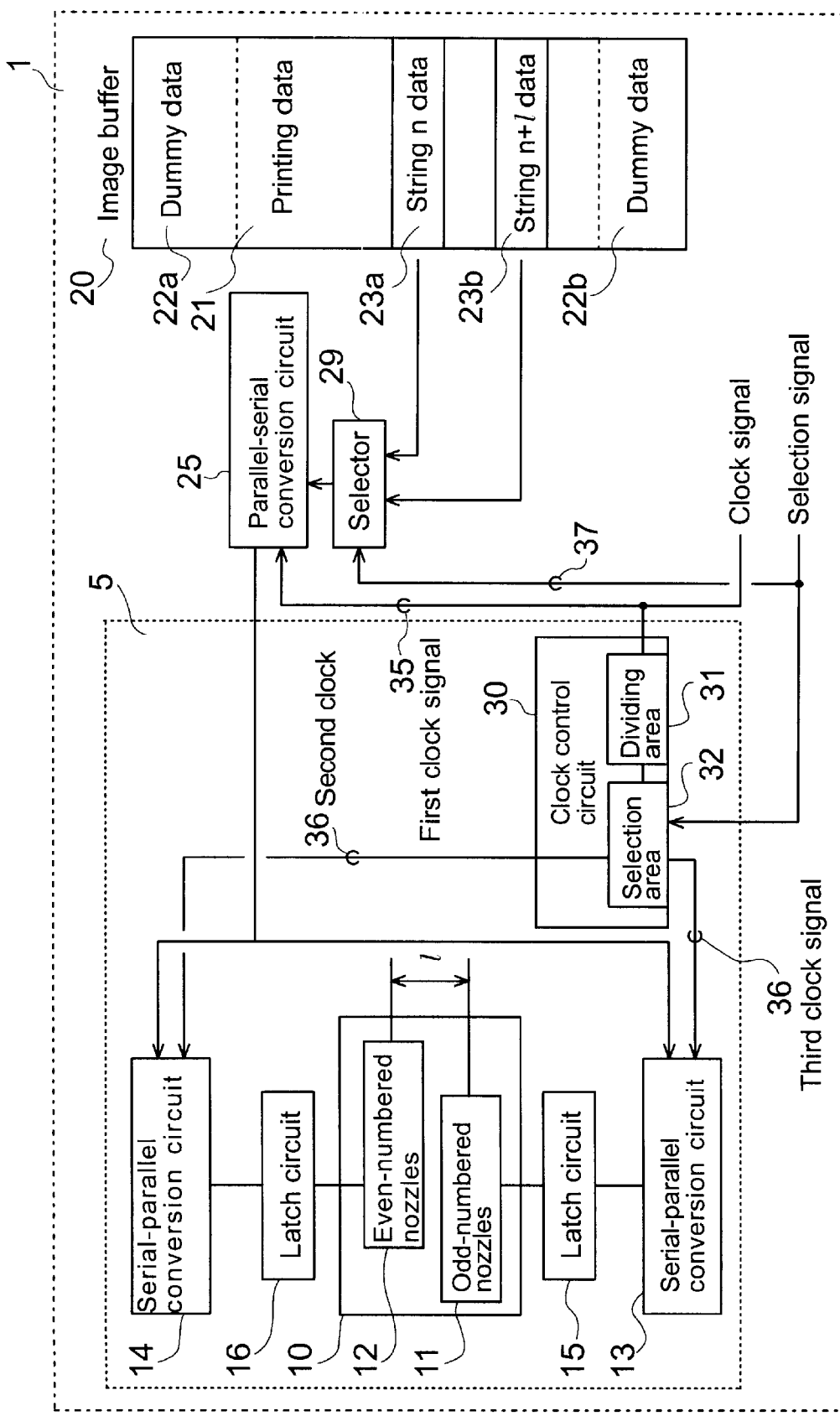
FIG. 1 is a block diagram showing the configuration of the circuit for transferring data in the printer of a first embodiment of the present invention.

FIG. 1 is a block diagram showing the circuit configuration of printer 1 of an embodiment of the present invention, and particularly shows the configuration of the control circuit that sends data from image buffer 20 to print head 5. Printer 1 in this embodiment is provided with print head 5 in which odd-numbered nozzles and even-numbered nozzles are positioned in a zigzag formation, and its printing area 10 has odd-numbered nozzle string 11 and even-numbered nozzle string 12 which are substantially parallel to each other and are separated by distance l. Data from image buffer 20 that has been converted from parallel to serial is set in odd-numbered nozzle string 11 via serial-parallel conversion circuit 13 and latch circuit 15; and data is set in even-numbered nozzle string 12 via serial-parallel conversion circuit 14 and latch circuit 16.

Image buffer 20 stores printing data 21 in which characters and symbols to be printed have been expanded into bit-map images. Image buffer 20 in this embodiment is additionally provided with dummy data 22a and 22b which correspond at least to distance l on both sides of the lines corresponding to the relative movement direction of print head 5. Dummy data 22a and 22b are filled with blanks, i.e., data for not printing dots using nozzle string 11 or 12. It is possible to provide dummy data 22 in a specified area of image buffer 20 beforehand; alternatively, it is also possible to automatically generate dummy data 22 on both sides of the information to be printed when converting such information into bit-map data.

Bit-mapped data is sent from image buffer 20 to print head 5 via parallel-serial conversion circuit 25. Two data strings are sequentially input via selector 29 into parallel-serial conversion circuit 25 in the present embodiment. This selector 29 is designed to sequentially select from the data expanded into image buffer 20 two data strings that are separated from each other by a printing distance of l, based on selection signal 37. For example, if it is assumed that distance l corresponds to a quantity of data of l strings, data 23a of string n which is to be printed by even-numbered nozzle string 12 and data 23b of string n+l which is to be printed by odd-numbered nozzle string 11 are selected, and then the data of string n+1 and the data of string (n+l)+1 are selected. Furthermore, selector 29 treats provided dummy data 22a and 22b in the same manner as printing data 21. Consequently, when odd-numbered nozzle string 11, for example, goes outside a line edge of printing data 21, blank dummy data is sent to odd-numbered nozzle string 11. Therefore, printing data 21 is printed by even-numbered nozzle string 12 only and not by odd-numbered nozzle string 11. The same operation takes place at the other line edge of printing data 21. Thus, selector 29 can send bit data to parallel-serial conversion circuit 25 without having to identify line edges. This configuration significantly simplifies the line edge processing in a printer in which nozzles are positioned in a zigzag formation.

Clock signal 36 is supplied to two serial-parallel conversion circuits 13 and 14 via clock control circuit 30. This clock signal 36 is obtained by halving first clock signal 35 which is supplied to parallel-serial conversion circuit 25 by clock control circuit 30. In order to accomplish these operations, clock control circuit 30 is provided with dividing area 31 for halving the first clock signal and with selection area 32 for supplying clock signal 36 to both serial-parallel conversion circuits 13 and 14. Therefore, in printer 1 of this embodiment, parallel-serial conversion circuit 25 on the side that sends data runs based on first clock signal 35, and serial-parallel conversion circuits 13 and 14 which set data in nozzle strings 11 and 12 run based on clock signal 36 which has half the number of cycles as first clock signal 35.

Figure 2:
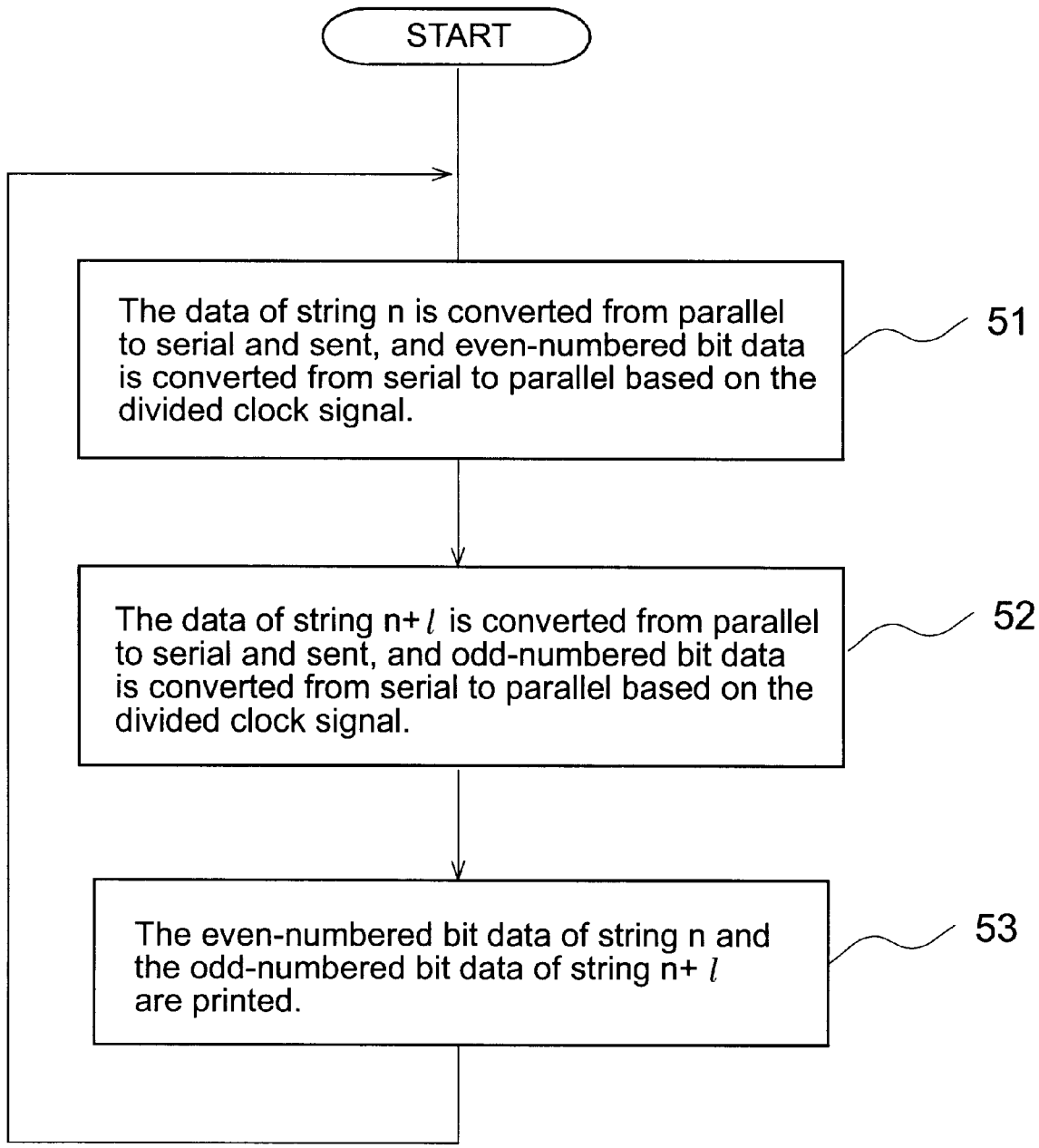
FIG. 2 is a flow chart illustrating the process of transferring the printing data shown in FIG. 1.
Figure 3:
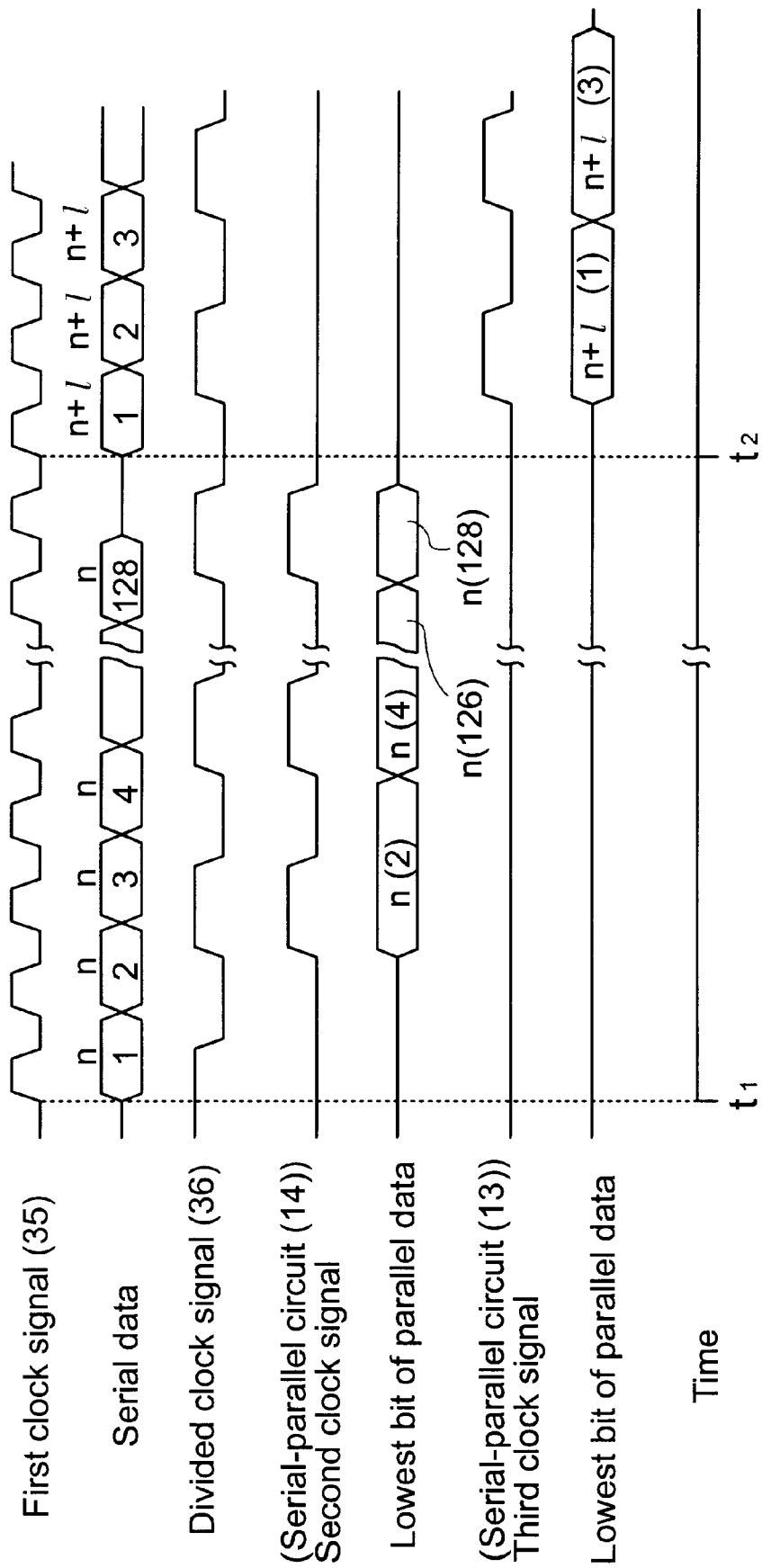
FIG. 3 is a timing diagram for transferring the printing data shown in FIG. 1.

The process in which data is sent from image buffer 20 to print head 5 for printing in printer 1 of this embodiment is explained with reference to the flow chart in FIG. 2 and the timing diagram in FIG. 3.

In step 51, parallel-serial conversion circuit 25 begins converting the data of string n from parallel to serial at time t1. Parallel-serial conversion circuit 25 runs based on clock signal 35, and sequentially supplies bits 1 through 128 of the data of string n to serial-parallel conversion circuits 13 and 14. At the same time, the divided clock signal 36 is supplied to serial-parallel conversion circuit 14 of even-numbered nozzles, and even-numbered data is selected from the serial data of string n that has been transferred. The divided clock signal 36 is obtained by halving first clock signal 35 at its falling edge by clock control circuit 30, and is supplied to serial-parallel conversion circuit 14 when parallel-serial conversion circuit 25 begins conversion in the timing sequence shown in FIG. 3. Based on this clock signal 36, data whose sending order is an even number is selected from the data of string n. In this way, the bit data to be printed by even-numbered nozzles can be obtained. During this process, the selection area of the clock control circuit under the direction of selection signal 37 ensures that no clock signal is supplied to serial-parallel conversion circuit 13 on the odd-numbered nozzle side, and thus the data of string n is not selected by the odd-numbered nozzle side.

When parallel-serial conversion circuit 25 finishes sending the last data of string n, i.e., bit 128 in this embodiment, it then converts the data of string n+1 from parallel to serial beginning at time t2. During this process, an interval of one clock period is left between the last bit of string n and the first bit of string n+1 so that the phase of clock signal 36 and that of the bit string become inverted from each other. Consequently, when the parallel-to-serial conversion of the data of string n+1 is started and the divided clock signal 36 is supplied to serial-parallel conversion circuit 13 on the odd-numbered nozzle side, odd-numbered data of string n+1 is selected. In this way, the bit data to be printed by odd-numbered nozzles can be obtained. During this process, the selection area of the clock control circuit under the direction of selection signal 37 ensures that no clock signal is supplied to serial-parallel conversion circuit 14 on the even-numbered nozzle side, and thus the data of string n+1 is not selected by the even-numbered nozzle side.

When bit 127, which is the last data of string n+1, is set in serial-parallel conversion circuit 13, the data of serial-parallel conversion circuits 13 and 14 is latched to latch circuits 15 and 16, respectively, and even-numbered dot images of string n represented by such latched data and odd-numbered dot images of string n+1 represented by such latched data are printed in step 53. When the printing is finished, the operation returns to step 51 and processing of the next bit string begins.

The above processes set the odd-numbered data of string n+1 in odd-numbered nozzles 11 of the multiple nozzles positioned in a zigzag formation, and set the even-numbered data of string n which is separated by distance 1 from string n+1 in even-numbered nozzles 12. Therefore, by repeating this process for printing, the nozzles positioned in a zigzag formation can be used to achieve high-resolution printing.

To continuously convert the data of string n and the data of string n+1 from parallel to serial and send them, it is preferable to first select the data for which the even-numbered bits are used, and then to select the next data, i.e., the data on the odd-numbered side, as in this embodiment. If the odd-numbered side is sent first followed by the even-numbered side, to skip the two continuing bits, i.e., the last bit of the odd-numbered side data and the first bit of the even-numbered side data, second clock signal 36 for serial-parallel conversion should be masked. This the circuitry becomes complicated.

Printer 1 of this embodiment achieves high-resolution printing by repeating the step of sending the data of the bit string corresponding to each nozzle string position and printing. Furthermore, in printer 1 of this embodiment, the circuit for sending data from the image buffer to the print head is implemented using a simplified circuit in which a circuit for converting the data inside the image buffer from parallel to serial is connected to a circuit for converting data from serial to parallel at the print head. Consequently, buffer circuits for temporarily storing the data of individual nozzle strings are not needed, nor is it necessary to switch control based on the printing direction of the print head. Furthermore, because blank dummy data 22 is provided inside image buffer 20 of the printer in this embodiment, a process such as stopping the printing by one of the nozzle strings at the line edge is unnecessary. Therefore, data transfer speed can be increased in a dot printer in which nozzles are positioned in a zigzag formation, and the associated CPU load can be reduced. Furthermore, because the circuit related to data transfer is simplified, the large number of circuit elements required for configuring the buffer circuit, etc. of the prior art can be dispensed with, resulting in a smaller gate array, and the area occupied by the control circuit can be reduced.

Furthermore, since it is not necessary to change the control method based on the printing direction of the print head, a single route can be used for transferring data from image buffer 20 to print head 5. Therefore, the print head can be made smaller and lighter in weight, and a high-speed compact printer offering excellent printing quality can be provided.

Figure 4:
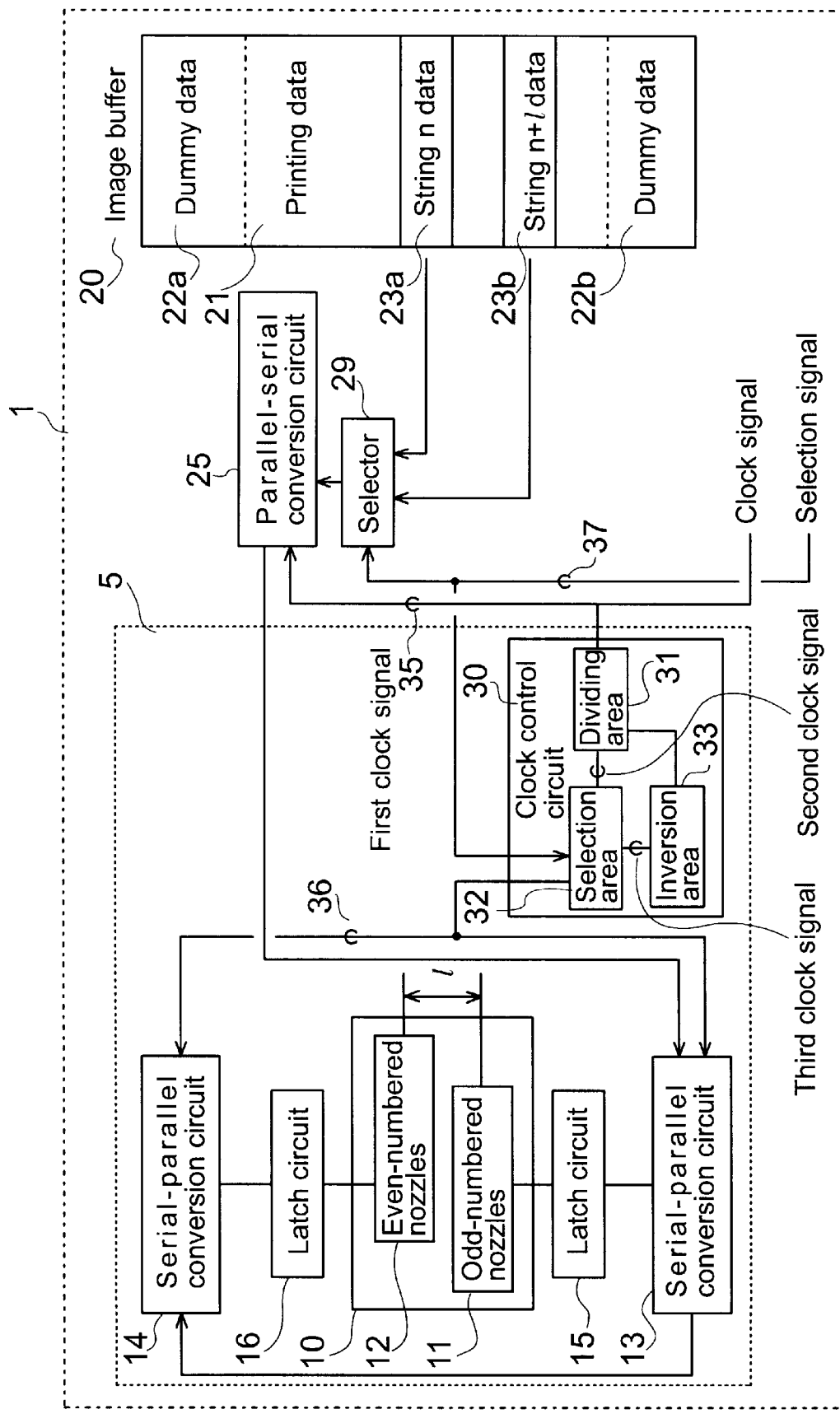
FIG. 4 is a block diagram showing the configuration of the circuit for transferring data in the printer in a second embodiment of the present invention.

FIG. 4 shows a block diagram of the circuit configuration of the printer in another embodiment of the present invention.

In printer 1 of this embodiment, the data inside image buffer 20 is sent to serial-parallel conversion circuit 13 on the odd-numbered nozzle side of print head 5 via parallel-serial conversion circuit 25. The serial-parallel conversion circuit 13 on the odd-numbered nozzle side is connected to serial-parallel conversion circuit 14 on the even-numbered nozzle side. Consequently, the data from image buffer 20 is sent to serial-parallel conversion circuit 14 on the even-numbered nozzle side via serial-parallel conversion circuit 13 on the odd-numbered nozzle side.

Clock control circuit 30 of this embodiment is provided with inversion area 33 that generates the third clock signal by inverting the divided second clock signal, in addition to dividing area 31 and selection area 32. Selection area 32 first supplies the divided second clock signal to both serial-parallel conversion circuits 13 and 14 according to selection signal 37, and then supplies the third clock signal.

Figure 5:
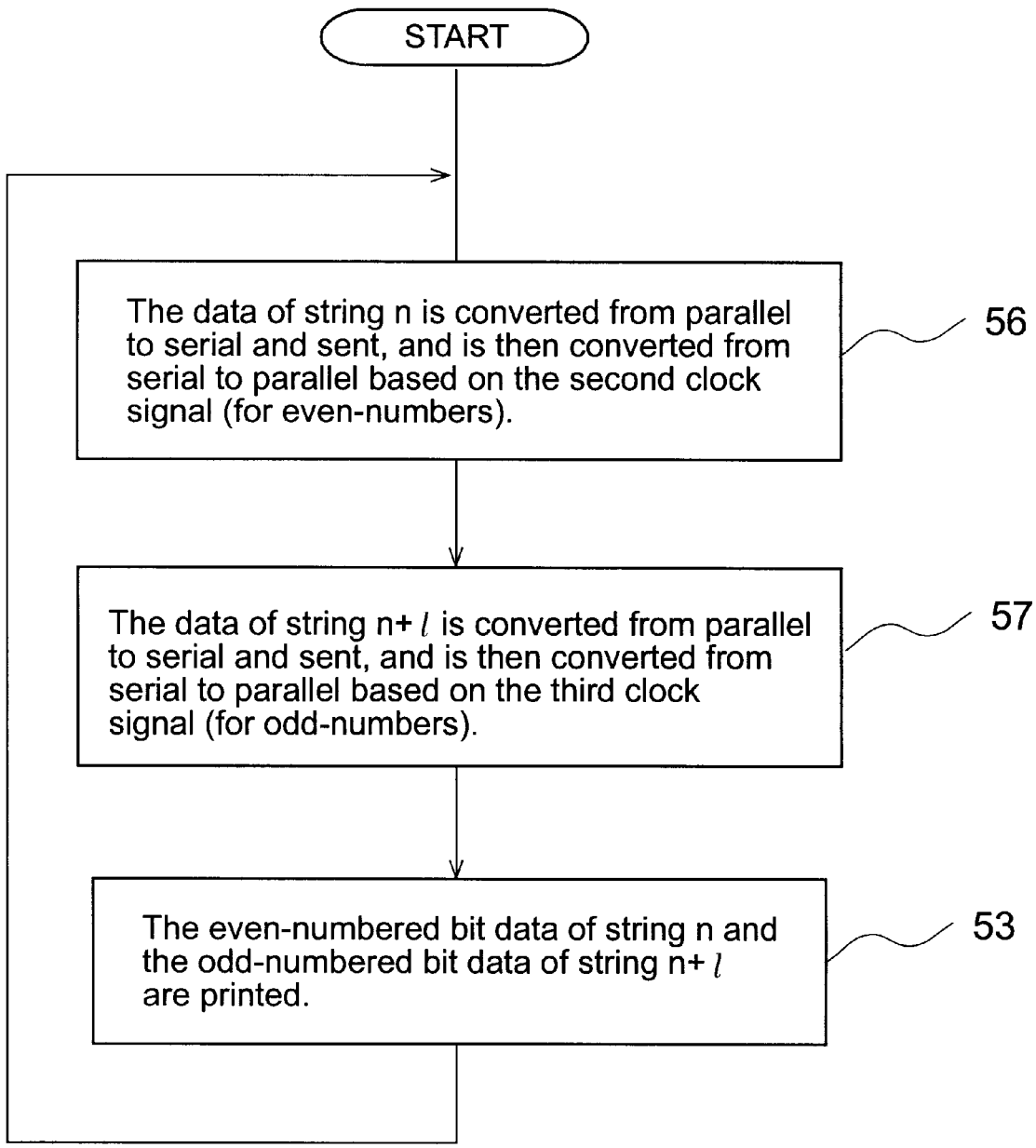
FIG. 5 is a flow chart illustrating the process of transferring the printing data shown in FIG. 4.
Figure 6:
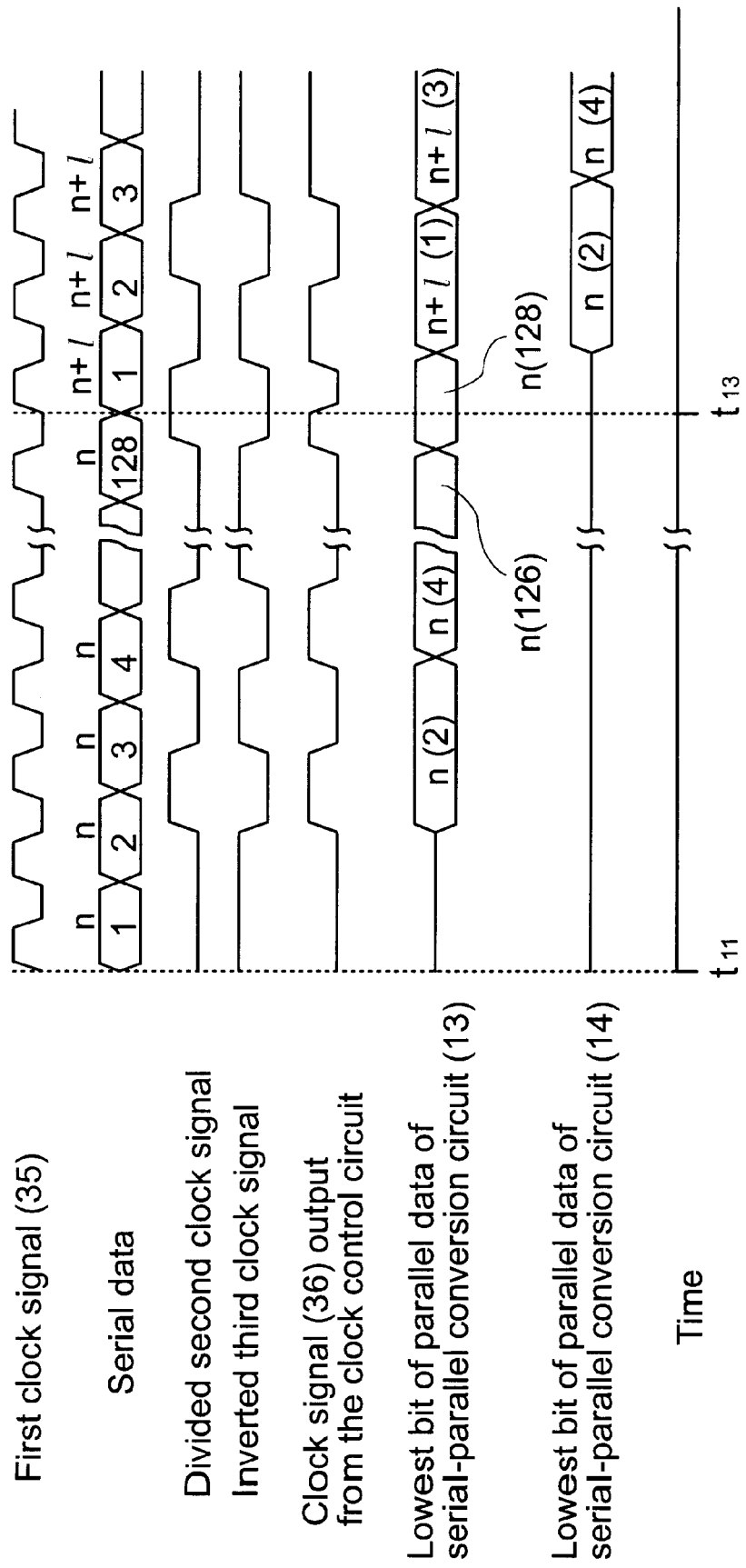
FIG. 6 is a timing diagram for transferring the printing data shown in FIG. 4.

The process of sending data from image buffer 20 to print head 5 and printing the data in the printer of this embodiment is explained with reference to the flow chart in FIG. 5 and the timing diagram in FIG. 6.

In step 56, parallel-serial conversion circuit 25 begins converting the data of string n from parallel to serial at time t11. At the same time, the divided second clock signal is supplied from clock control circuit 30 to both serial-parallel conversion circuits 13 and 14 on the odd-numbered and even-numbered nozzle sides, respectively. Based on this supplied clock signal, even-numbered data of string n is sequentially selected by serial-parallel conversion circuit 13 on the odd-numbered nozzle side.

When bit 128, which is the last even-numbered data of string n, is sent to serial-parallel conversion circuit 13, the data of string n+1 is converted by parallel-serial conversion circuit 25 from time t13 in step 57, immediately following the data of string n, and is sent to serial-parallel conversion circuit 13 on the odd-numbered nozzle side. At the same time, a phase-inverted and divided clock signal (the third clock signal) is supplied from clock control circuit 30 to serial-parallel conversion circuits 13 and 14 on the odd-numbered and even-numbered nozzle sides, respectively. Based on this supplied third clock signal, odd-numbered data of string n+1 is sequentially selected by serial-parallel conversion circuit 13 on the odd-numbered nozzle side. Concurrently, even-numbered data of string n is sequentially sent from serial-parallel conversion circuit 13 to serial-parallel conversion circuit 14 on the even-numbered nozzle side. Therefore, when all of the odd-numbered data of string n+1 is set in serial-parallel conversion circuit 13 on the odd-numbered nozzle side, all of the even-numbered data of string n is set in serial-parallel conversion circuit 14 on the even-numbered nozzle side. When the setting of data is finished, even-numbered dots of string n represented by the stored data and odd-numbered dots of string n+1 represented by the stored data are printed in step 53, as in the embodiment of FIG. 1 as described above, producing a high-resolution print output.

Figure 7:
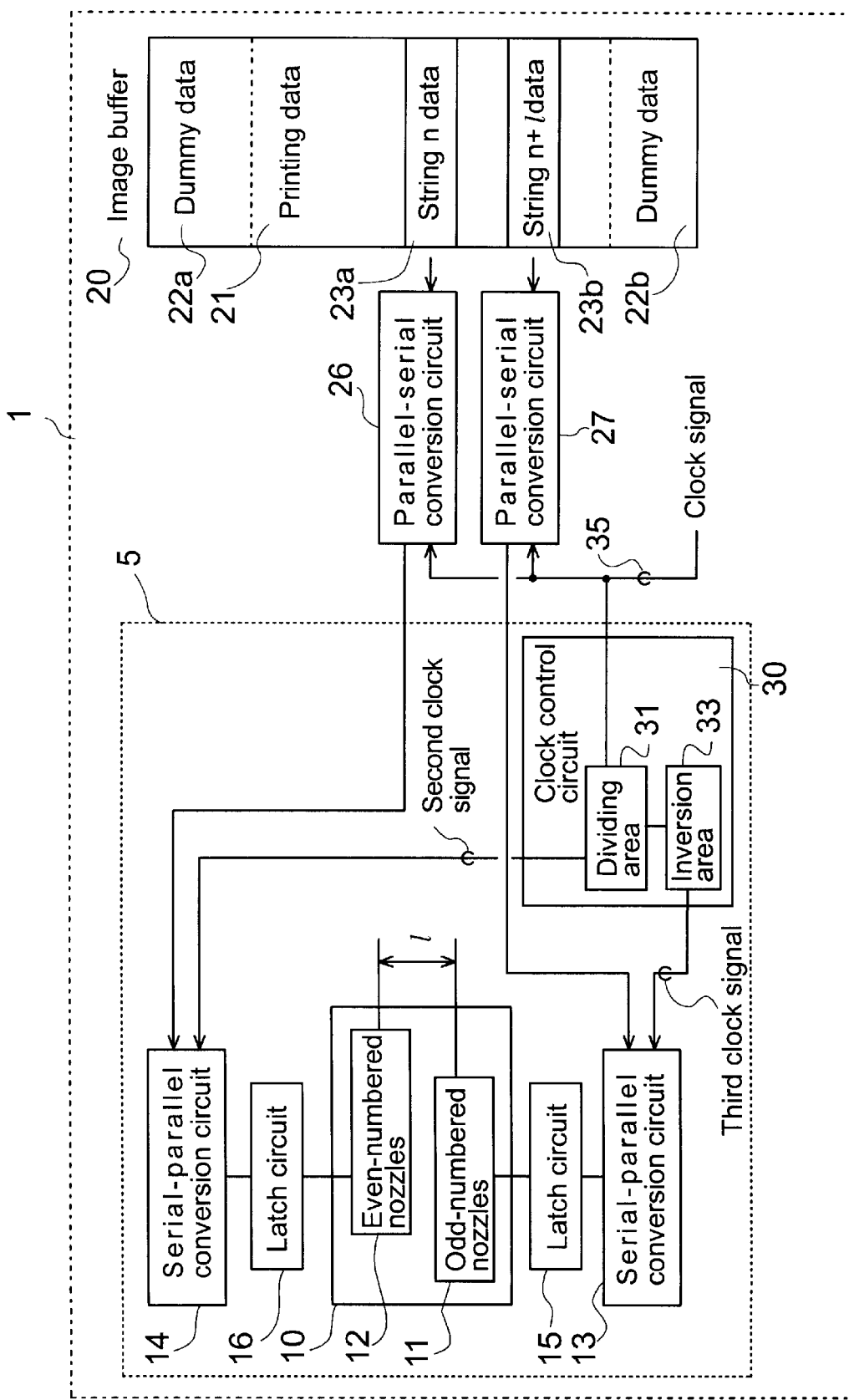
FIG. 7 is a block diagram showing the configuration of the circuit for transferring data in the printer of a third embodiment of the present invention.

FIG. 7 is a block diagram illustrating the circuit configuration for data transfer in the printer in another embodiment of the present invention.

The printer in this embodiment is provided with parallel-serial conversion circuits 26 and 27. Parallel-serial conversion circuit 26 converts the data that corresponds to the position of even-numbered nozzle 12 inside image buffer 20 (i.e., the data of string n in the figure) and sends it to serial-parallel conversion circuit 14 on the even-numbered nozzle side. Parallel-serial conversion circuit 27 converts the data that corresponds to the position of odd-numbered nozzle 11 inside image buffer 20 (i.e., the data of string n+1 in the figure) and sends it to serial-parallel conversion circuit 13 on the odd-numbered nozzle side.

Clock control circuit 30 is provided with dividing area 31 for dividing first clock signal 35 and with inversion area 33 for inverting the divided clock signal. The divided second clock signal is supplied from clock control circuit 30 to serial-parallel conversion circuit 14 on the even-numbered nozzle side, and additionally the inverted third clock signal is supplied to serial-parallel conversion circuit 13 on the odd-numbered nozzle side.

Figure 8:
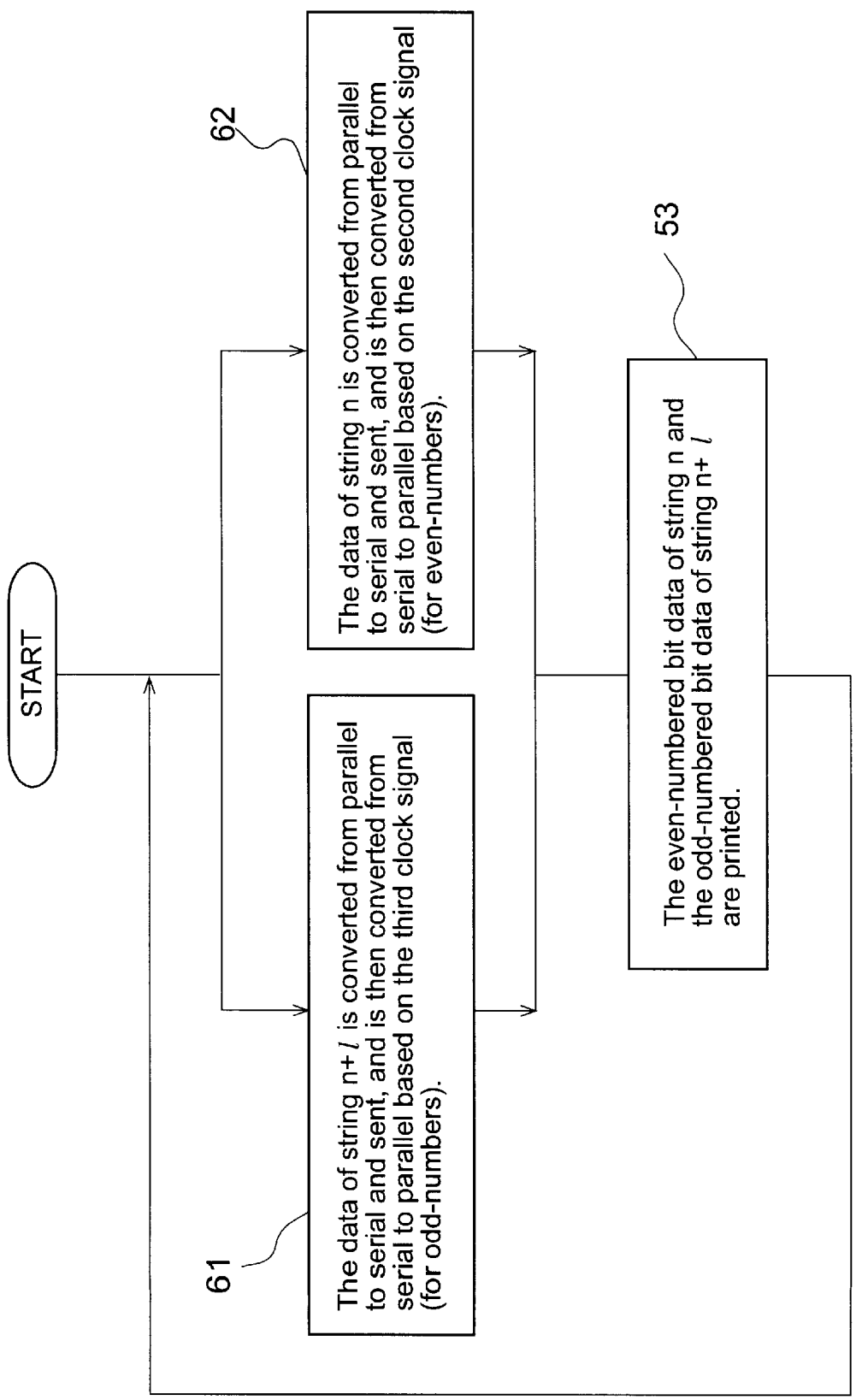
FIG. 8 is a flow chart illustrating the process of transferring the printing data shown in FIG. 7.

Because the printer in this embodiment is provided with two parallel-serial conversion circuits 26 and 27, both the data of string n and the data of string n+1 are simultaneously converted from parallel to serial in steps 62 and 61, respectively, and are sent to the print head, as shown in the flow chart in FIG. 8. These two sets of data are also simultaneously converted from serial to parallel at the print head. In step 61, the divided clock signal for odd-numbers is supplied to serial-parallel conversion circuit 13 on the odd-numbered nozzle side, and odd-numbered data are selected from the data of string n+1 and are set. At the same time, in step 62, the clock signal for even-numbers (which is obtained by inverting the clock signal for odd-numbers) is supplied to serial-parallel conversion circuit 14 on the even-numbered nozzle side, and even-numbered data are selected from the data of string n and are set. When the setting of both the odd-numbered data and even-numbered data is completed, a high-resolution output is printed in step 53, as in the previously described embodiments.

Because the printer of this embodiment is provided with two parallel-serial conversion circuits, two strings of data can be processed in parallel and sent simultaneously to the print head. Consequently, the processing time required for data transfer can be reduced further.

Figure 9:
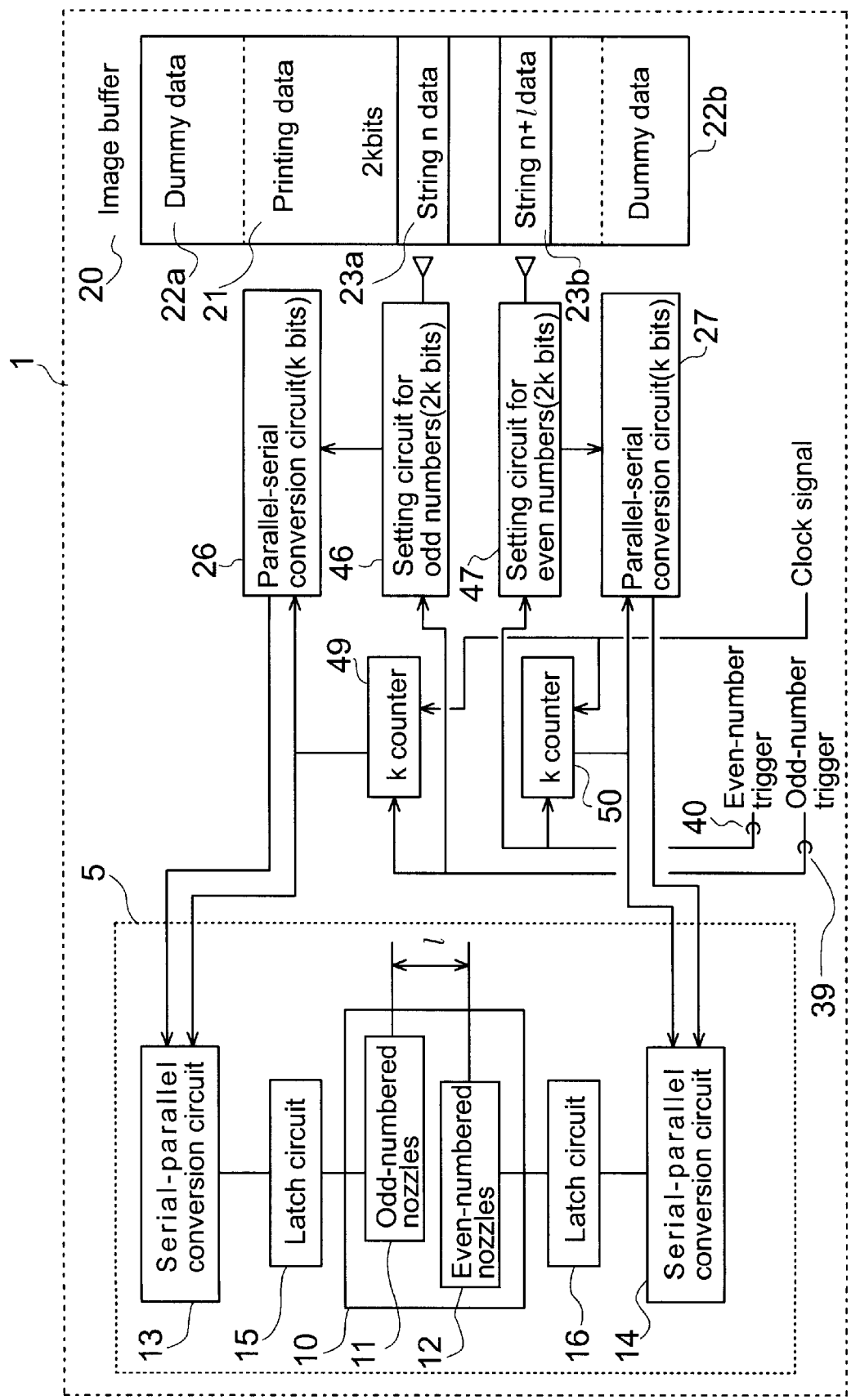
FIG. 9 is a block diagram showing the configuration of the circuit for transferring data in the printer of a fourth embodiment of the present invention.

FIG. 9 is a block diagram illustrating the circuit configuration of the printer in another embodiment of the present invention.

In printer 1 of this embodiment, the data selected and sent from image buffer 20 is set in odd-numbered nozzle string 11 via serial-parallel conversion circuit 13 and latch circuit 15, and data is set in even-numbered nozzle string 12 via serial-parallel conversion circuit 14 and latch circuit 16.

Bit-mapped data from image buffer 20 is first set in setting circuits 46 and 47. Selected data is then sent from these setting circuits 46 and 47 to print head 5 via parallel-serial conversion circuits 26 and 27. In the printer of this embodiment, two bit strings that correspond to the printing positions of odd-numbered nozzle string 11 and even-numbered nozzle string 12, respectively, and whose printing positions are separated from each other by distance l, are selected from the data expanded in image buffer 20 and are set in setting circuits 46 and 47. For example, if it is assumed that distance l corresponds to a quantity of data of l strings, data 23a of string n which is to be printed by odd-numbered nozzle string 11 is set in setting circuit 46, and data 23b of string n+l which is to be printed by even-numbered nozzle string 12 is set in setting circuit 47. Then, when printing is finished, the data of string n+1 is set in setting circuit 46 and the data of (n+l)+1 is set in setting circuit 47.

At the line edges, the provided dummy data 22a and 22b are treated in the same manner as printing data 21. Consequently, when odd-numbered nozzle string 11, for example, goes outside a line edge of printing data 21, blank dummy data is set in setting circuit 46 which sends data to odd-numbered nozzle string 11. Therefore, printing data 21 is printed by even-numbered nozzle string 12 only and not by odd-numbered nozzle string 11. The same operation takes place at the other line edge of printing data 21. As explained above, the printer in this embodiment can send data to the print head without changing the processing method even at line edges. Therefore, the line edge processing in a printer in which nozzles are positioned in a zigzag formation can be significantly simplified.

The 2-k bit data to be printed by print head 5 can be selected as a single unit from the data inside image buffer 20 and set in setting circuits 46 and 47 of this embodiment. For example, in the printer of this embodiment, the entire 128-bit data can be set in each of setting circuits 46 and 47. On the other hand, parallel-serial conversion circuits 26 and 27 have configurations in which data can be converted from parallel to serial in k-bit units. For example, in the printer of this embodiment, conversion circuits 26 and 27 can each convert 64 bits of parallel data to serial data. Furthermore, parallel-serial conversion circuits 26 and 27 select the odd-numbered and even-numbered bits that correspond to odd-numbered nozzle string 11 and even-numbered nozzle string 12 from the bit strings set in setting circuits 46 and 47, and convert those bits from parallel to serial.

For this reason, the k-bit input into parallel-serial conversion circuit 26 which sends data to odd-numbered nozzle string 11 is connected only to the odd-numbered bits of the 2-k bits in setting circuit 46. It is also possible to mask the even-numbered bits of the 2-k bit data in setting circuit 46 and supply the result to parallel-serial conversion circuit 26. Likewise, the k-bit input into parallel-serial conversion circuit 27 which sends data to even-numbered nozzle string 12 is connected only to the even-numbered bits of the 2-k bits in setting circuit 47. It is also possible to mask the odd-numbered bits of the 2-k bit data in setting circuit 47 and supply the result to parallel-serial conversion circuit 27.

With such a configuration, parallel-serial conversion circuit 26 converts only the odd-numbered bit data of the printing data of string n from parallel to serial, and sends the result to serial-parallel conversion circuit 13. Serial-parallel conversion circuit 13 converts this received bit data from serial to parallel, and sets the result in odd-numbered nozzle string 11 via latch circuit 15. Meanwhile, parallel-serial conversion circuit 27 converts only the even-numbered bit data of the printing data of string n+1 from parallel to serial, and sends the result to serial-parallel conversion circuit 14. Serial-parallel conversion circuit 14 converts this received bit data from serial to parallel, and sets the result in even-numbered nozzle string 12 via latch circuit 16.

These parallel-serial conversion processes are controlled by counters 49 and 50 which output k pulses based on clock signals when trigger signals are received. When odd-number trigger 39 is supplied, the data of string n is first set in setting circuit 46 for odd numbers. Based on this odd-number trigger 39, counter 49 which controls odd-numbered nozzle string 11 begins counting based on the clock signal, and k pulses are output to parallel-serial conversion circuit 26. The transfer data for odd numbers that have been converted from parallel to serial is output based on these pulses. Furthermore, the pulse signals output by said counter 49 are also supplied to serial-parallel conversion circuit 14 which accepts the transfer data for odd numbers, and the k-bit transfer data which is synchronized by the pulses from said counter 49 is sent and received. The same operations take place at counter 50 which controls even-numbered nozzle string 12.

Figure 10:
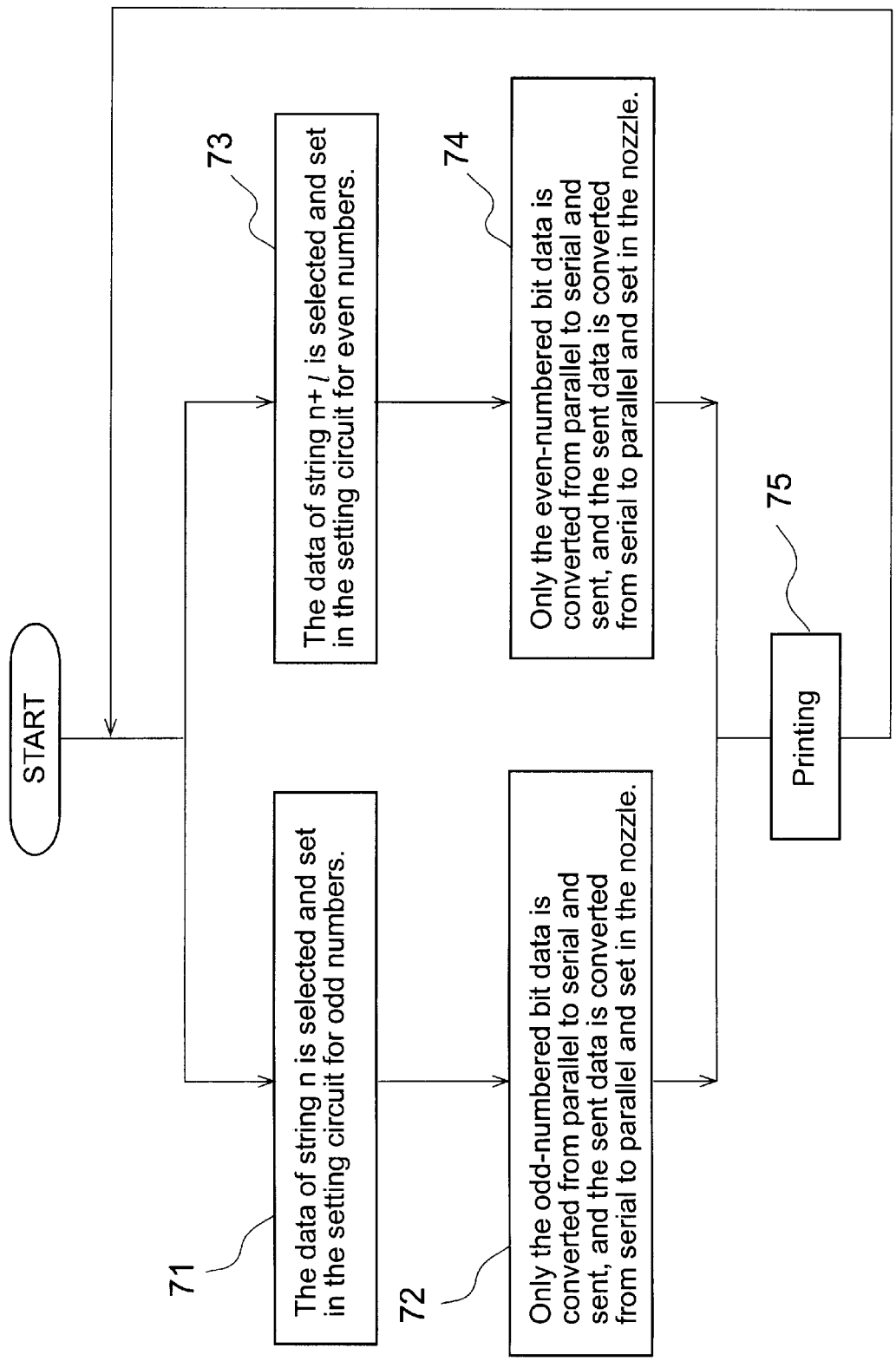
FIG. 10 is a flow chart illustrating the process of transferring the printing data shown in FIG. 9.

The process of sending data from image buffer 20 to print head 5 in order to print the data using printer 1 of this embodiment is explained with references to the flow chart in FIG. 10.

In step 71, the data of string n to be printed by odd-numbered nozzle string 11 is selected from the printing data inside image buffer 20, and this 2-k bit data is set in setting circuit 46 for the odd-numbered nozzle string. If a bit string corresponding to odd-numbered nozzle string 11 does not exist at the printing of the line edges, blank dummy data is selected and set in setting circuit 46. In step 72, data consisting of only the odd-numbered bits (k bits) of the data that is set in setting circuit 46 is converted by parallel-serial conversion circuit 26 and sent. The data sent to serial-parallel conversion circuit 13 is then converted from serial to parallel and is set in odd-numbered nozzle string 11.

Meanwhile, the data of string n+1 to be printed by even-numbered nozzle string 12 is set in setting circuit 47 in step 73. If a bit string corresponding to even-numbered nozzle string 12 does not exist at the printing of the line edges, blank dummy data is selected in the same way as explained above. In step 74, data consisting of only the even-numbered bits (k bits) of the data that is set in setting circuit 47 is converted by parallel-serial conversion circuit 27 and sent; the data sent to serial-parallel conversion circuit 14 is then converted from serial to parallel and is set in even-numbered nozzle string 12. A dot image is then printed in step 75. When the printing is finished, the operation returns to step 71 or step 73, and setting and conversion of the next data to be printed begin. In the process thus described, odd-numbered data of string n is set in odd-numbered nozzle string 11 of print head 5 on which multiple nozzles are positioned in a zigzag formation, and even-numbered data of string n+1 which is separated from string n by distance l is set in even-numbered nozzle string 12. In this embodiment, steps 71 and 72 which handle odd-numbered bit data and steps 73 and 74 which handle even-numbered bit data can be performed simultaneously, thus shortening the process time for sending data. Of course, it is possible to perform one pair of steps before the other in sequence.

In the printer of this embodiment, when the timing of trigger signals 39, 40 is the same or the same signal is used for both, data transfer to the odd-numbered nozzle string can be processed in parallel with data transfer to the even-numbered nozzle string, and thus data can be transferred at a higher speed than is possible with a sequential transfer. In this case one counter could be used instead of two. Irrespective of whether the data transfer from the printer main part to the print head is in parallel or sequential, this and the following embodiments allow for a higher transfer speed because the same clock rate used for parallel-serial conversion is also used for serial-parallel conversion. Incidentally, a start and stop control as provided by both counters 49 and 50 or just one of them may also be applied to the clock signal 35 in the first to third embodiments, if necessary.

Figure 11:
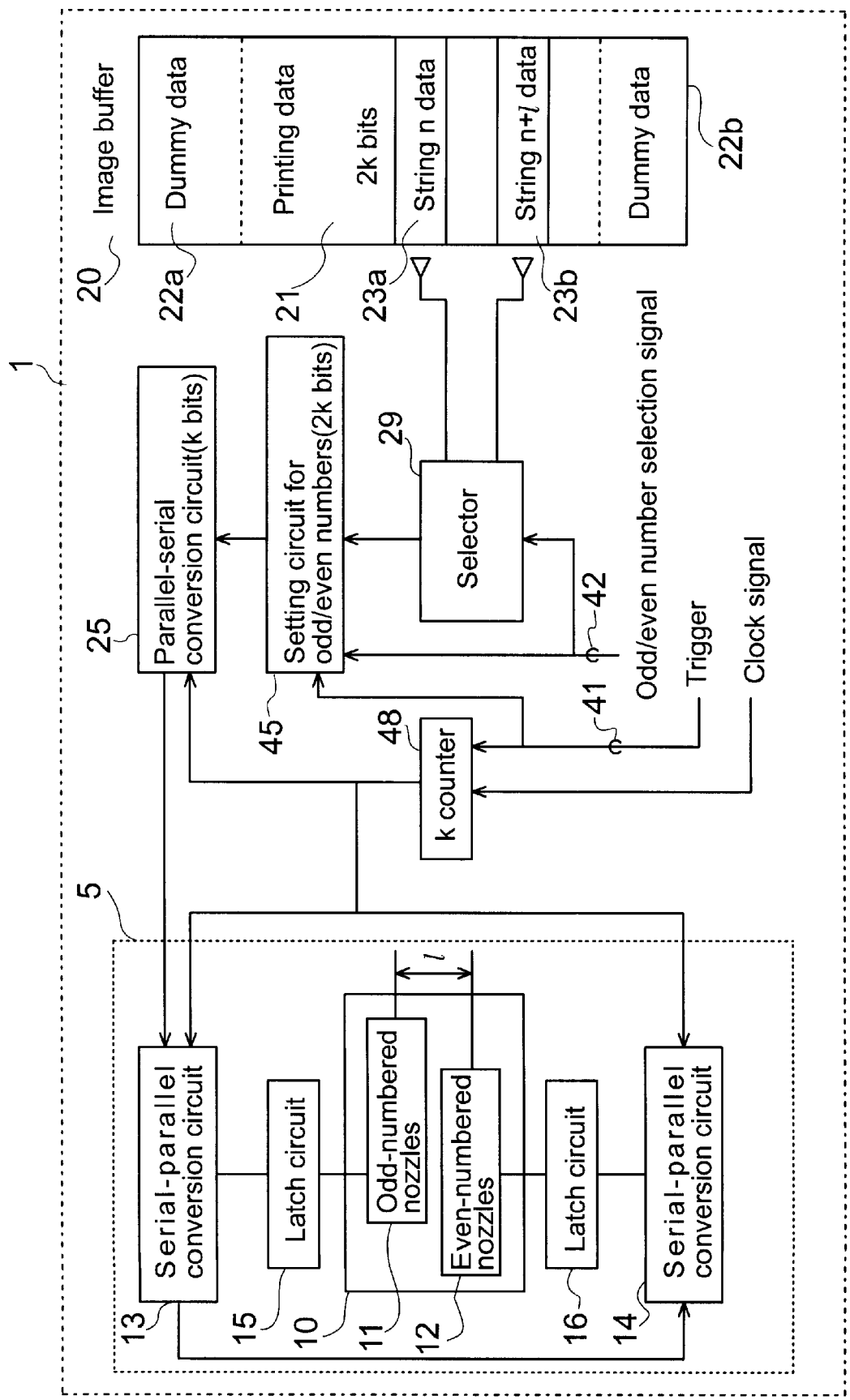
FIG. 11 is a block diagram showing the configuration of the circuit for transferring data in the printer of a fifth embodiment of the present invention.

FIG. 11 is a block diagram illustrating the circuit configuration of the printer in another embodiment of the present invention.

The printer in this embodiment has selector 29, and this selector 29 is used to select data 23a of string n and data 23b of string n+1 from the data in image buffer 20. Selector 29 sets a bit string in single setting circuit 45 which then supplies data to parallel-serial conversion circuit 25. This parallel-serial conversion circuit 25 sends data to serial-parallel conversion circuit 13 on the odd-numbered nozzle side of print head 5. Serial-parallel conversion circuit 14 on the even-numbered side is connected to serial-parallel conversion circuit 13 on the odd-numbered nozzle side, and receives the data sent from parallel-serial conversion circuit 25 via said serial-parallel conversion circuit 13.

Parallel-serial conversion circuit 25 and serial-parallel conversion circuits 13 and 14 run based on the pulse signals supplied from counter 48. Counter 48 begins counting based on trigger signal 41, and outputs k pulse signals according to the clock signal timing. Trigger signal 41 is also supplied to setting circuit 45; and based on the trigger signal 41, setting circuit 45 supplies data to parallel-serial conversion circuit 25. Setting circuit 45 is a 2-k bit register and sends to a k bit parallel-serial conversion circuit 25 by switching between odd-numbered and even-numbered bits based on odd/even number selection signal 42. This kind of control can be easily implemented using a data selector.

Figure 12:
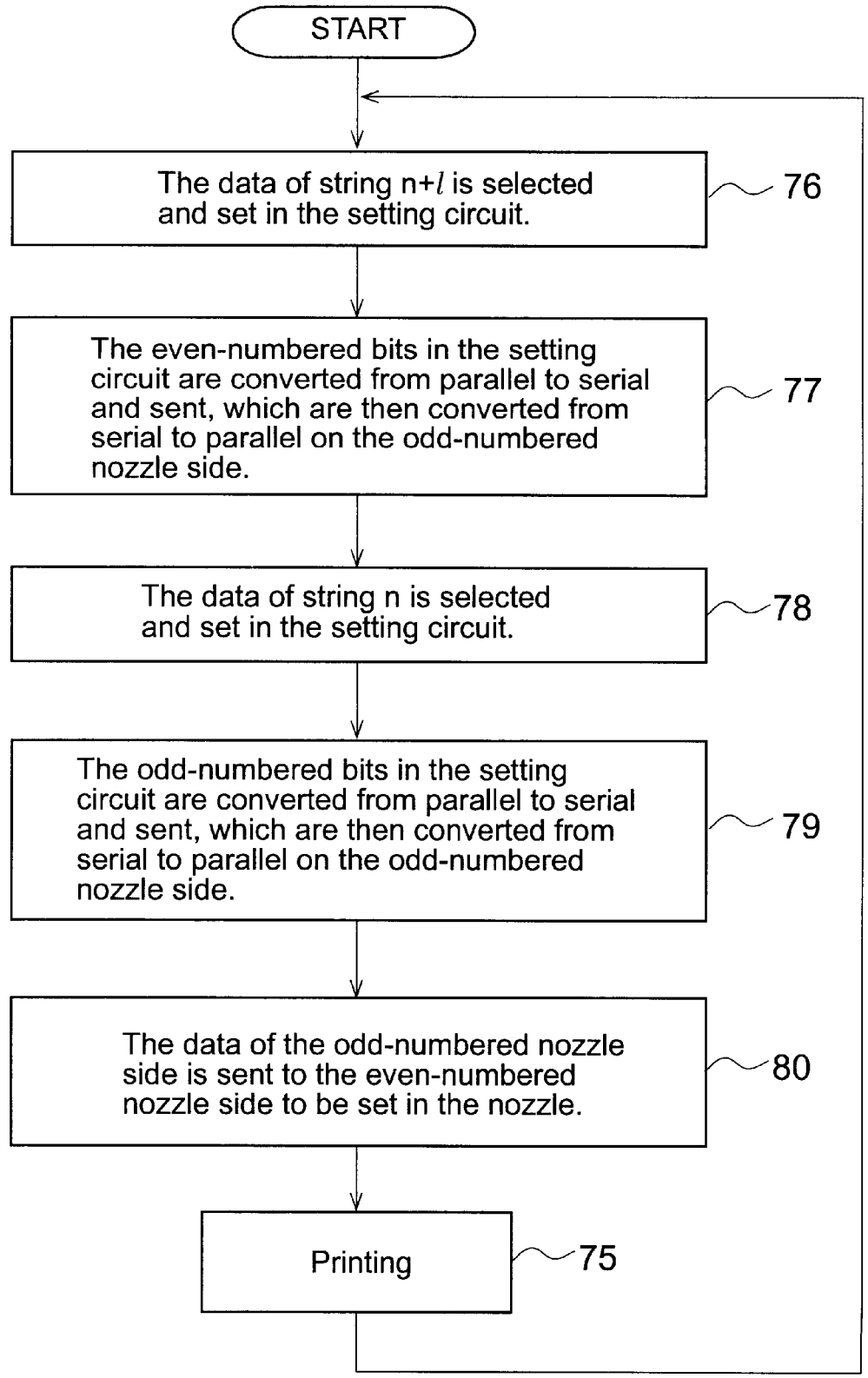
FIG. 12 is a flow chart illustrating the process of transferring the printing data shown in FIG. 11.

The process of sending data from image buffer 20 to print head 5 in order to print the data using the printer in this embodiment is explained with references to the flow diagram in FIG. 12.

In step 76, odd/even number selection signal 42 is first set to an even number. Based on this signal, selector 29 selects the data of string n+1 corresponding to even-numbered nozzle string 12 and sets it in setting circuit 45. In step 77, even-numbered bits are supplied from setting circuit 45 to parallel-serial conversion circuit 25 based on odd/even number selection signal 42. Based on trigger signal 41, counter 48 supplies pulse signals to parallel-serial conversion circuit 25, and the even-numbered bits of string n+1 are sent to serial-parallel conversion circuit 13 on the odd-numbered nozzle side. These bits are then converted from serial to parallel by said serial-parallel conversion circuit 13. When k pulse counts are completed at counter 48, odd/even number selection signal 42 is set to an odd number in step 78. Based on this, selector 29 selects the data of string n corresponding to odd-numbered nozzle string 11 and sets it in setting circuit 45. In step 79, odd-numbered bits are supplied from setting circuit 45 to parallel-serial conversion circuit 25 based on odd/even number selection signal 42. Based on trigger signal 41, counter 48 begins supplying pulse signals again. Based on these pulse signals, the odd-numbered bits of string n are sent to serial-parallel conversion circuit 13 on the odd-numbered nozzle side, are again converted from parallel to serial, and are set in nozzle 11. The pulse signals from counter 48 are simultaneously supplied to serial-parallel conversion circuit 14 on the even-numbered nozzle side, in addition to serial-parallel conversion circuit 13 on the odd-numbered side. Therefore, in step 80, the even-numbered bit data of string n+1 that is output from serial-parallel conversion circuit 13 on the odd-numbered side is sent to serial-parallel conversion circuit 14 on the even-numbered nozzle side and is set in nozzle 12. In these steps, the odd-numbered data bits of string n are set in serial-parallel conversion circuit 13 on the odd-numbered side, and the even-numbered data bits of string n+1 are set in serial-parallel conversion circuit 14 on the even-numbered side. When the setting is finished, a high-resolution output is printed in step 75, as in the embodiments described above.

In this embodiment, parallel-serial conversion circuit 25 is designed to first send data to serial-parallel conversion circuit 13 on the odd-numbered side, and then to send data to serial-parallel conversion circuit 14 on the even-numbered side via said serial-parallel conversion circuit 13. Therefore, only one transfer route to print head 5 is needed. Naturally, it is also possible to send data to serial-parallel conversion circuit 13 on the odd-numbered side via serial-parallel conversion circuit 14 on the even-numbered side. In such a case, the aforementioned process is reversed, i.e., odd-numbered bit data is sent first, followed by even-numbered bit data.

Figure 13:
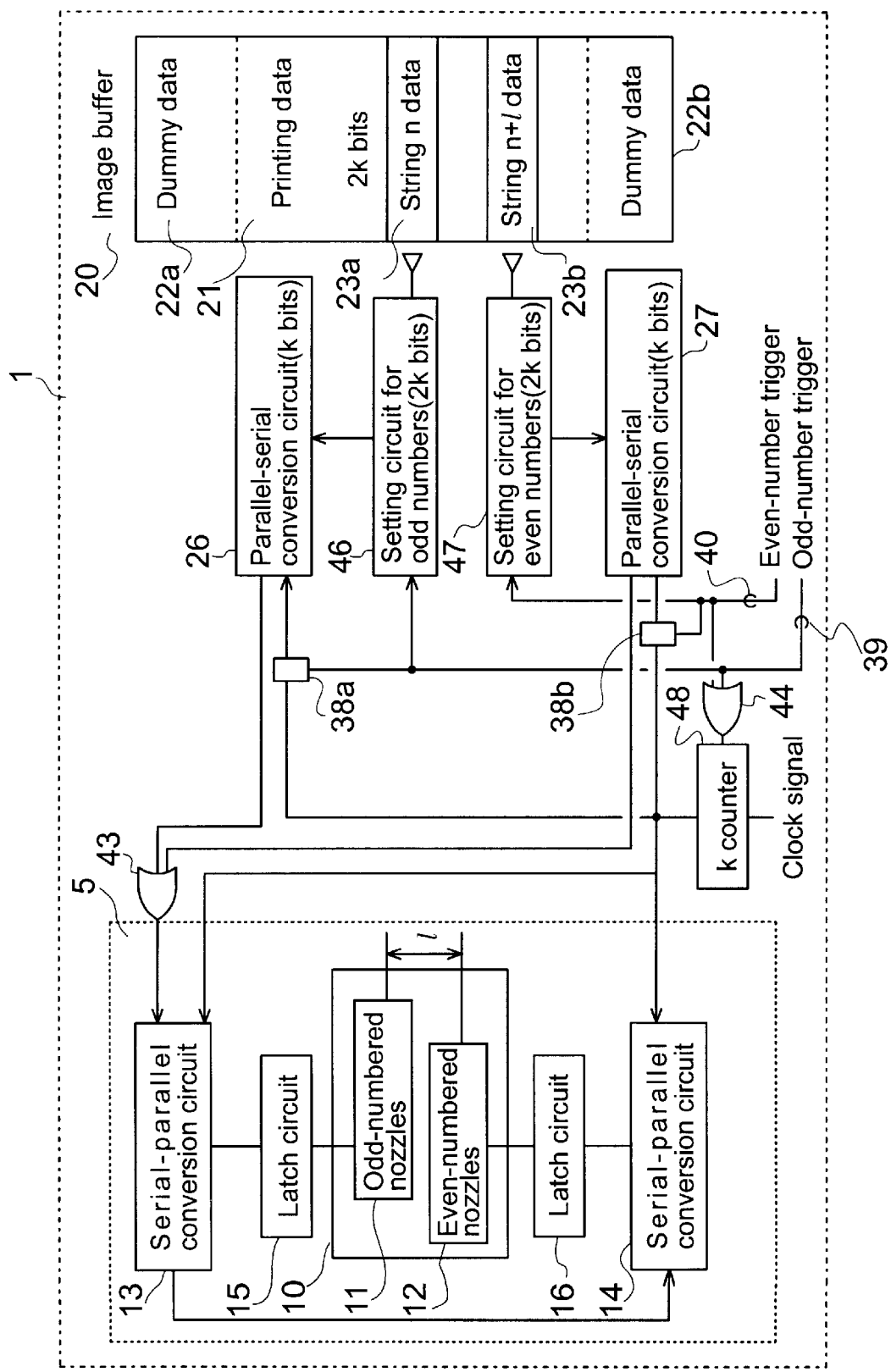
FIG. 13 is a block diagram showing the configuration of the circuit for transferring data in the printer of a sixth embodiment of the present invention.

FIG. 13 is a block diagram illustrating the configuration of the data-transmission circuit of the printer in another embodiment of the present invention.

The printer in this embodiment, as in the embodiment of FIG. 9, is provided with two setting circuits 46 and 47 and two parallel-serial conversion circuits 26 and 27. Therefore, the data of string n corresponding to odd-numbered nozzle string 11 is set in setting circuit 46, and the odd-numbered bit data from this data is sent by parallel-serial conversion circuit 26. The operation is the same on the even-numbered nozzle string 12 side, i.e., the data of string n+1 is set in setting circuit 47 and the even-numbered bit data is sent by parallel-serial conversion circuit 27. In the printer in this embodiment, both parallel-serial conversion circuits 26 and 27 send serialized data to serial-parallel conversion circuit 13 on the odd-numbered nozzle side via OR gate 43. As in the embodiment of FIG. 11, serial-parallel conversion circuit 14 on the even-numbered side is connected to serial-parallel conversion circuit 13, and receives data from image buffer 20 via said serial-parallel conversion circuit 13.

Since parallel-serial conversion circuits 26 and 27 send data to the same serial-parallel conversion circuit 13, they run in sequence. For this reason, pulse signals are supplied from a single counter 48 to these circuits. An even number trigger and an odd number trigger are supplied to counter 48 via OR gate 44, and counting starts based on either of these triggers. On the other hand, because parallel-serial conversion circuits 26 and 27 must run in sequence, switching circuits 38a and 38b are installed to turn on/off the supply of pulse signals to these circuits. Parallel-serial conversion circuits 26 and 27 begin running based on an odd-number or even-number trigger, and stop when k pulses are output from the counter.

Figure 14:
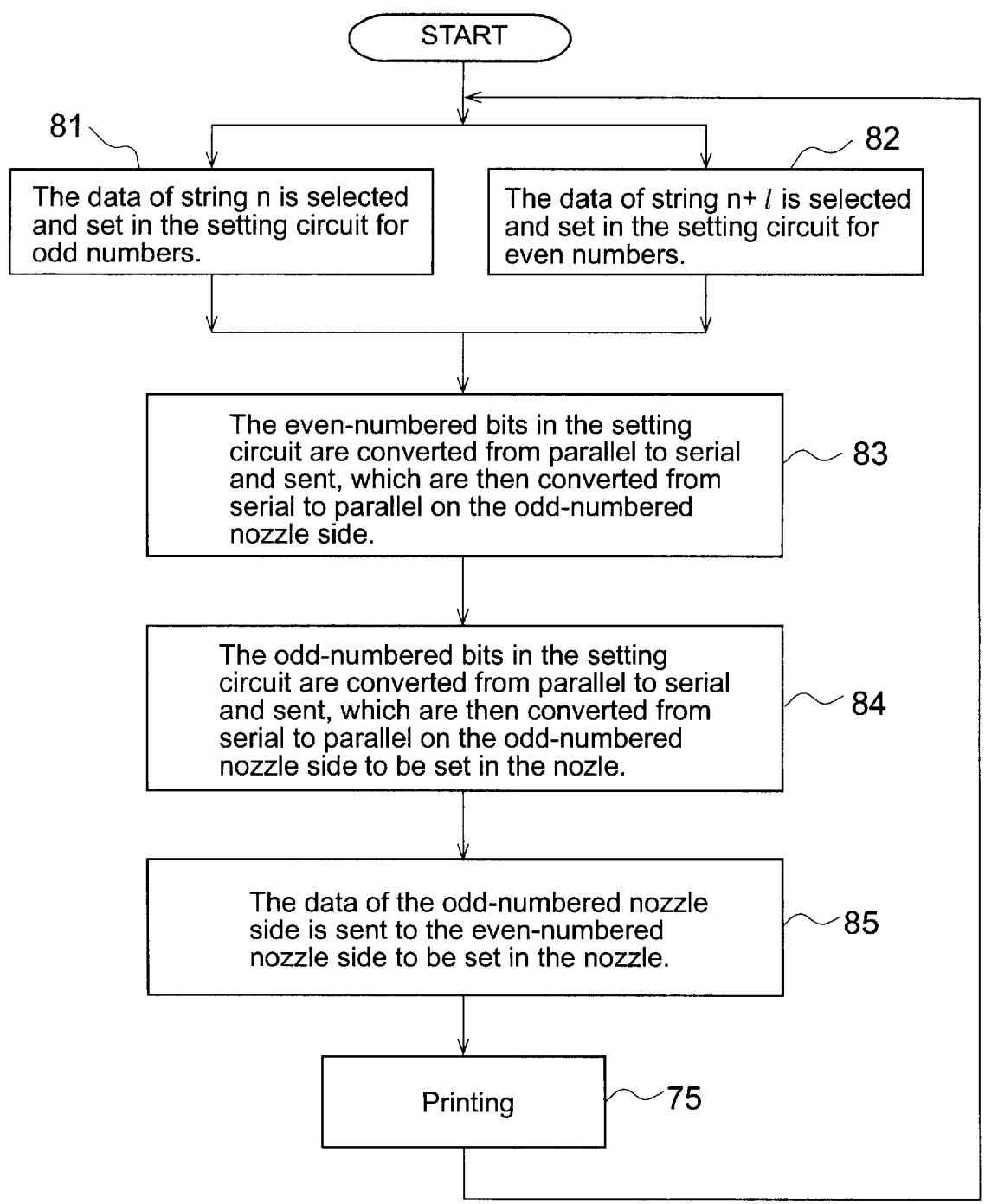
FIG. 14 is a flow chart illustrating the process of transferring the printing data shown in FIG. 13.
Figure 15:
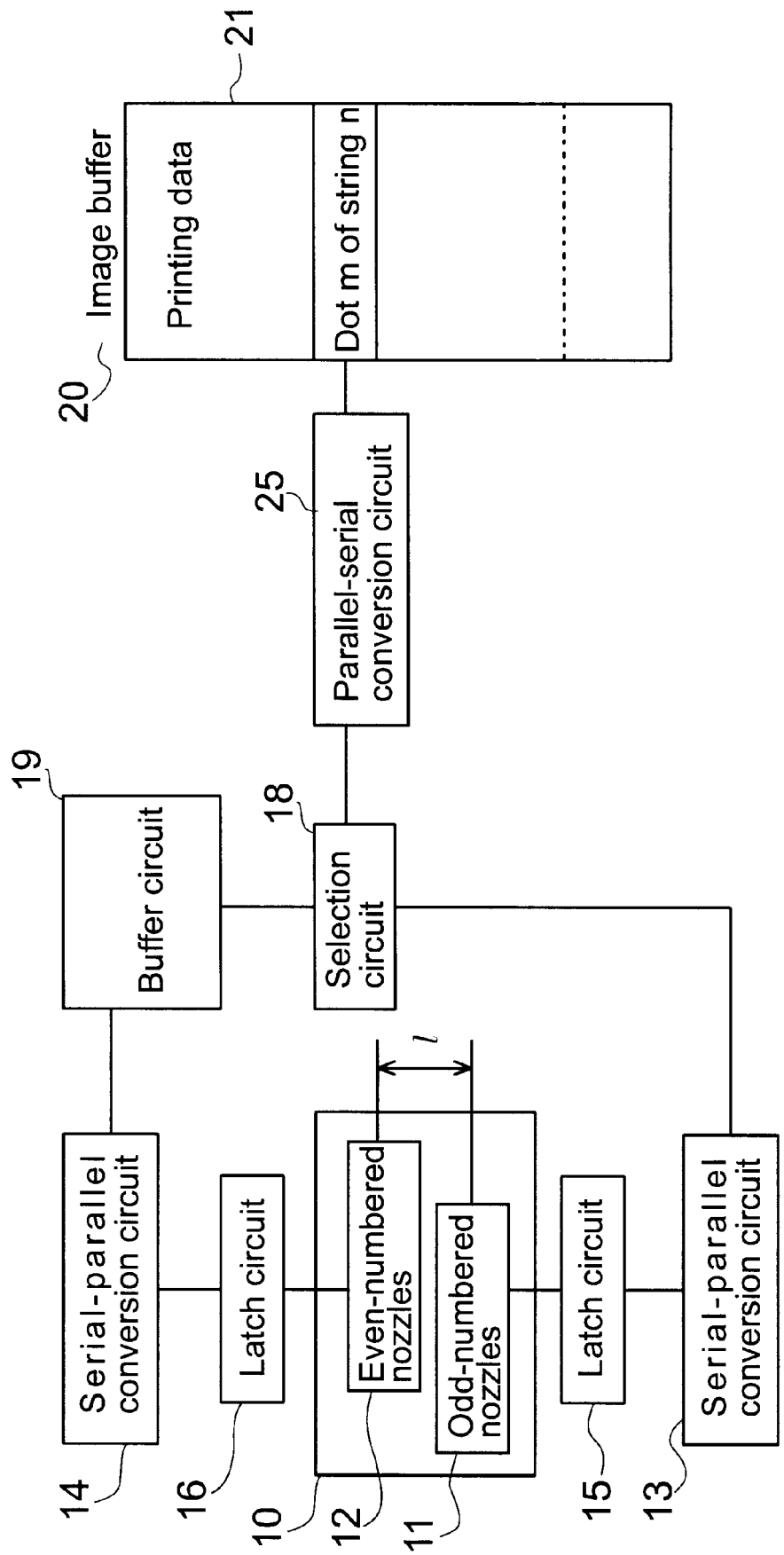
FIG. 15 is a block diagram showing the configuration of a conventional circuit for transferring printing data.
Figure 16:
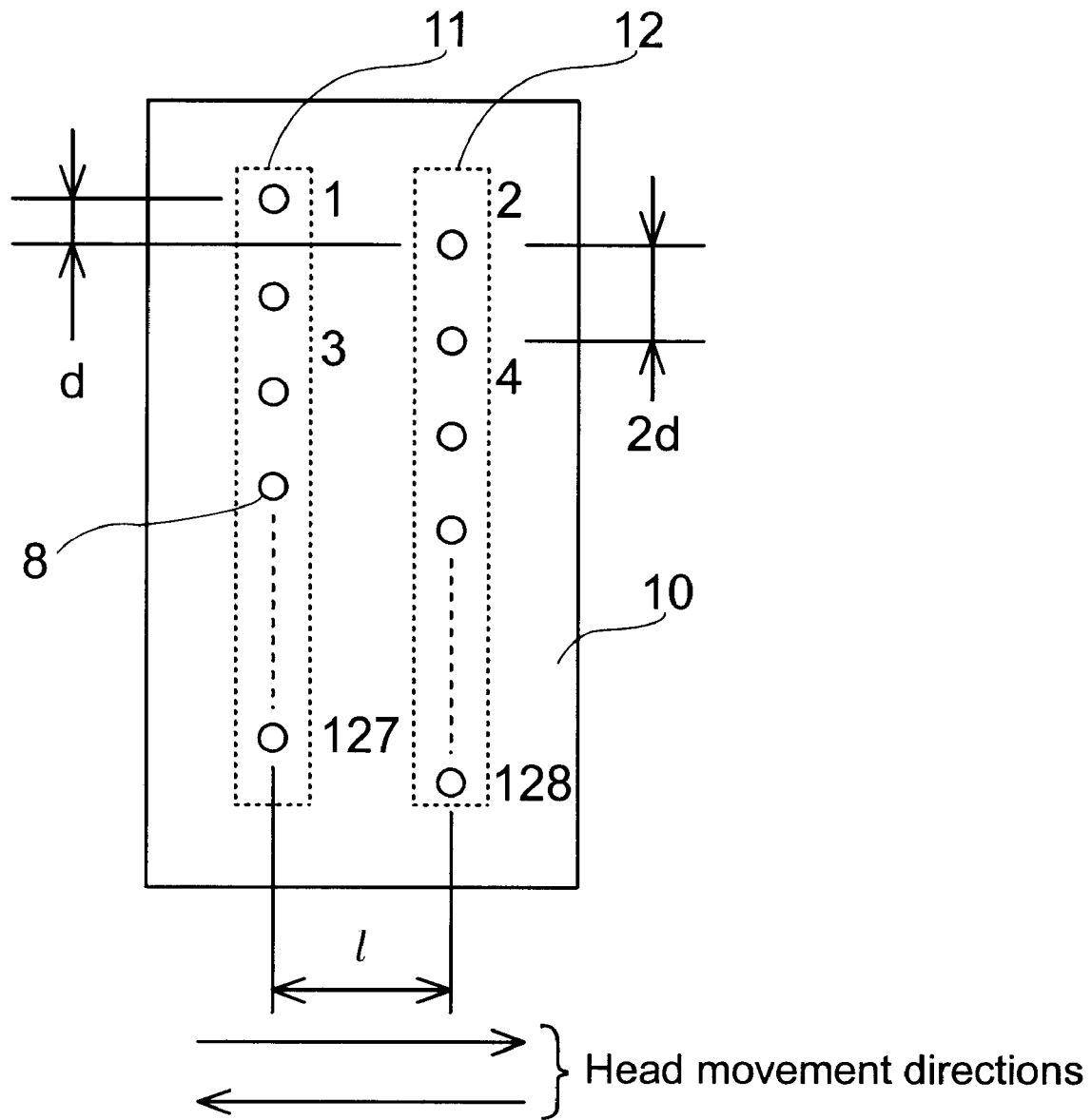
FIG. 16 is a diagram showing an overview of the printing area of a head in which multiple nozzles are positioned in a zigzag formation.

The process of sending data from image buffer 20 to print head 5 in order to print the data using the printer in this embodiment is explained with references to the flow diagram in FIG. 14.

In step 81, the data of string n to be printed by odd-numbered nozzle string 11 is selected and set in setting circuit 46 for odd numbers. Meanwhile, in step 82, the data of string n+1 to be printed by even-numbered nozzle string 12 is selected and set in setting circuit 47 for even numbers. These steps 81 and 82 can be performed simultaneously or sequentially.

Next, in step 83, an even number trigger is input, the counter begins counting, and switching circuit 38b goes on. As a result, the even-numbered bit data of string n+1 is sent from parallel-serial conversion circuit 27 on the even-numbered side to serial-parallel conversion circuit 13 on the odd-numbered nozzle side. When k pulses have been sent out from counter 48, an odd-number trigger is generated in step 84, and counter 48 begins counting again. Switching circuit 38a goes on based on an odd-number trigger and parallel-serial conversion circuit 26 on the odd-numbered side begins running. Through this action, the odd-numbered data of the bit strings set in setting circuit 46 is sent to serial-parallel conversion circuit 13 on the odd-numbered nozzle side.

In step 85, the data that was sent to serial-parallel conversion circuit 13 on the odd-numbered nozzle side in step 83, is sent from said serial-parallel conversion circuit 13 to serial-parallel conversion circuit 14 on the even-numbered nozzle side, and the even-numbered bit data of string n+1 is set. This step is the same as the step in which even-numbered bit data is set in serial-parallel conversion circuit 14 on the even-numbered nozzle side in the embodiment of FIG. 11. When the setting of odd-numbered data and even-numbered data is completed, printing is performed in step 75 as in earlier embodiments.

Note that although the aforementioned embodiments are explained using a printer in which multiple nozzles for printing dots are alternately positioned in a zigzag formation in two strings, the present invention can also be applied to printers in which nozzles are positioned on three or more strings. Furthermore, the present invention is not limited in its application to non-impact type dot printers using nozzles, and can of course be applied to impact type dot printers such as wire-dot printers.

What is claimed is:

1. A printing apparatus having a print head for moving relative to a recording medium to print thereon and including first and second sets of print elements respectively arranged along first and second lines in a zigzag formation disposed at a predetermined distance from each other in parallel in a direction transverse to a moving direction of the print head, and a print data storage for storing print data consisting of dot data to be printed by said print elements, said first and second sets of print elements compensating each other in printing, comprising:

a dummy data storage that is filled with blank dummy data on both sides of the print data in the relative moving direction of said print head, a first data setting circuit that reads from said print data storage and said dummy data storage first print data corresponding to a print position of said first set of print elements, and that selects first dot data corresponding to each of said first set of print elements;

a second data setting circuit that reads from said print data storage and said dummy data storage second print data corresponding to a print position of said second set of print elements, and that selects second dot data corresponding to each of said second set of print elements; and a print controller that controls each of said first and second sets of print elements to print a respective one of said selected dot data; and wherein one of said first and second data setting circuits comprises an even dot selector that sets even dot data in even positions and the other one of said first and second data setting circuits comprises an odd dot selector that sets odd dot data in odd positions.

2. A printing apparatus according to claim 1, further comprising:

first and second parallel-to-serial transfer circuits that convert said dot data selected by said first and second data setting circuits into serial data and for transferring said serial data to a corresponding set of print elements.

3. A printing apparatus according to claim 2, comprising a clock signal generator that generates a predetermined clock signal; wherein said first and second parallel-to-serial transfer circuits transfer said serial data in accordance with said predetermined clock signal; and said first and second data setting circuits supply the first and second parallel-to-serial transfer circuits corresponding to the selected dot data with said predetermined clock signal.

4. A printing apparatus according to claim 3, comprising a counter that counts a predetermined number of pulses of said clock signal; wherein said first and second data setting circuits stop the supply of said clock signal after said count reaches said predetermined number.

5. A printing apparatus according to claim 1, wherein:

said first and second data setting circuits comprise:

a first clock signal generator that outputs a first clock signal;

a second clock signal generator that divides said first clock signal and outputs a second clock signal;

a third clock signal generator that generates a third clock signal different in phase from said second clock signal;

a parallel-to-serial converter that converts said first and second print data into serial data in accordance with said first clock signal;

said even dot selector comprises:

a first serial-to-parallel converter that, in accordance with said second clock signal, selects said even dot data out of said serial data sent from said parallel-to-serial converter and converts said even dot data into parallel data; and said odd dot selector comprises:

a second serial-to-parallel converter that, in accordance with said third clock signal, selects said odd dot data out of said serial data sent from said parallel-to-serial converter and converts said odd dot data into parallel data.

6. A printing apparatus according to claim 5, wherein at least one of said first and second serial-to-parallel converters comprises a serial output for passing through said serial data sent from said parallel-to-serial converter;

an input of the other of said first and second serial-to-parallel converters is connected to said output of said at least one serial-to-parallel converter; and said serial data is input to said at least one serial-to-parallel converter directly and to the other serial-to-parallel converter through said at least one serial-to-parallel converter.

7. A method of controlling a printing apparatus having a print head for moving relative to a recording medium to print thereon and including first and second sets of print elements respectively arranged along first and second lines in a zigzag formation disposed in parallel at a predetermined distance from each other in a direction transverse to a moving direction of the print head, and a storage storing print data consisting of dot data to be printed by said print elements, said first and second sets of print elements compensating each other in printing, comprising the steps of:

(a) reading first print data from said storage corresponding to a print position of said first set of print elements;

(b) reading second print data from said storage corresponding to a print position of said second set of print elements;

(c) selecting first dot data corresponding to each of said first set of print elements;

(d) selecting second dot data corresponding to each of said second set of print elements;

(e) simultaneously controlling each of said first and second sets of print elements to print a respective one of said selected dot data:

and wherein said steps (c) and (d) respectively comprise the steps of:

(f) selecting even dot data in even positions of the corresponding print data; and (g) selecting odd dot data in odd positions of the corresponding print data:

and wherein said steps (a) and (b) respectively comprise the steps of:

(h) reading blank dummy data as the first print data from said storage when said first set of print elements is positioned outside line edges: and (i) reading blank dummy data as the second print data from said storage when said second set of print elements is positioned outside line edges.

8. A method according to claim 7 further comprising the steps of:

(j) selecting dot data out of said first and second dot data;

(k) converting said selected dot data into serial data and transferring the serial data to the corresponding set of print elements;

(l) selecting the remaining dot data not selected in step (j);

(m) converting said selected remaining dot data into serial data and transferring the serial data to the corresponding set of print elements.

9. A method according to claim 8, wherein said serial data is transferred in accordance with a predetermined clock signal, in steps (k) and (m); said selected dot data is applied with said predetermined clock signal in steps (j) and (l).

10. A method according to claim 7, comprising:

generating a first clock signal;

generating a second clock signal;

generating a third clock signal different in phase from said second clock signal;

converting said first and second print data into serial data in accordance with said first clock signal;

and wherein said step (f) further comprises:

in accordance with said second clock signal, selecting said even dot data out of said serial data from said serial conversion step and converting said even dot data into parallel data;

and wherein said step (g) further comprises:

in accordance with said third clock signal, selecting said odd dot data out of said serial data from said serial conversion step and converting said odd dot data into parallel data.

* * * * *

UNITED STATES PATENT AND TRADEMARK OFFICE
CERTIFICATE OF CORRECTION

PATENT NO. : 6,086,272
DATED : July 11, 2000
INVENTOR(S) : Yuji Kawase, et al.

Page 1 of 2

It is certified that error appears in the above-identified patent and that said Letters Patent is hereby corrected as shown below:

Title page,
Abstract,
Item [57] Change "n+1" to -- n+$\ell$ --.

Column 1,
Line 27, change "distance 1" to -- distance $\ell$ --.
Line 45, change "distance 1" to -- distance $\ell$ --.
Line 63, change "distance 1" to -- distance $\ell$ --.

Column 6,
Line 20, change "distance 1" to -- distance $\ell$ --.
Line 30, change "distance 1" to -- distance $\ell$ --.
Line 45, change "distance of 1" to -- distance of $\ell$ --.
Line 47, change distance 1" to -- distance $\ell$ --.
Line 49, change "n+1" to -- n+$\ell$ --.
Line 51, change "(n+1)+1" to -- (n+$\ell$)+1 --.

Column 7,
Line 41, change "n+1" to -- n+$\ell$ --.
Line 44, change "n+1" to -- n+$\ell$ --.
Line 47, change "n+1" to -- n+$\ell$ --.
Line 49, change "n+1" to -- n+$\ell$ --.
Line 57, change "n+1" to -- n+$\ell$ --.
Line 55, change "n+1" to -- n+$\ell$ --.
Line 62, change "n+1" to -- n+$\ell$ --.
Line 67, change "n+1" to -- n+$\ell$ --.

UNITED STATES PATENT AND TRADEMARK OFFICE
CERTIFICATE OF CORRECTION

PATENT NO.   : 6,086,272
DATED        : July 11, 2000
INVENTOR(S)  : Yuji Kawase, et al.

It is certified that error appears in the above-identified patent and that said Letters Patent is hereby corrected as shown below:

<u>Column 8,</u>
Line 2, change "distance 1" to -- distance $\ell$ --.
Line 3, change "n+1" to -- n+$\ell$ --.
Line 7, change "n+1" to -- n+$\ell$ --.

Signed and Sealed this

Twenty-seventh Day of November, 2001

Attest:

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,086,272
DATED : July 11, 2000
INVENTOR(S) : Yuji Kawase, et al.

It is certified that error appears in the above-identified patent and that said Letters Patent is hereby corrected as shown below:

<u>Title page,</u>
ABSTRACT, Item [57] Change "n+1" to -- n+ℓ --.

<u>Column 1,</u>
Lines 27, 45 and 63, change "distance 1" to -- distance ℓ --.

<u>Column 6,</u>
Lines 20, 30, 45 and 47 change "distance 1" to -- distance ℓ --.
Line 49, change "n+1" to -- n+ℓ --.
Line 51, change "(n+1)+1" to -- (n+ℓ)+1 --.

<u>Column 7,</u>
Lines 41, 44, 47, 49, 55, 57, 62 and 67, change "n+1" to -- n+ℓ --.

<u>Column 8,</u>
Line 2, change "distance 1" to -- distance ℓ --.
Lines 3 and 7, change "n+1" to -- n+ℓ --.

<u>Column 9,</u>
Lines 16, 25, 31, 36, 51 and 64, change "n+1" to -- n+ℓ --.

<u>Column 10,</u>
Line 6, change "n+1" to -- n+ℓ --.
Line 35, change "distance 1" to -- distance ℓ --.
Line 38, change "distance 1" to -- distance ℓ -- and change "data of 1" to -- data of ℓ --.
Line 41, change "n+1" to -- n+ℓ --.
Line 44, change "(n+1)+1" to -- (n+ℓ)+1 --.

<u>Column 11,</u>
Line 66, change "n+1" to -- n+ℓ --.

<u>Column 12,</u>
Lines 16 and 44, change "n+1" to -- n+ℓ --.
Line 17, change "distance 1" to -- distance ℓ --.

UNITED STATES PATENT AND TRADEMARK OFFICE
CERTIFICATE OF CORRECTION

PATENT NO. : 6,086,272
DATED : July 11, 2000
INVENTOR(S) : Yuji Kawase, et al.

It is certified that error appears in the above-identified patent and that said Letters Patent is hereby corrected as shown below:

Column 13,
Lines 5, 11, 31, 37 and 63, change "n+1" to -- n+ℓ --.

Column 14,
Lines 26, 32 and 48, change "n+1" to -- n+ℓ --.

This certificate supersedes Certificate of Correction issued November 27, 2001.

Signed and Sealed this

Twenty-sixth Day of March, 2002

*Attest:*

*Attesting Officer*

JAMES E. ROGAN
*Director of the United States Patent and Trademark Office*